(12) United States Patent
Reece et al.

(10) Patent No.: US 11,521,620 B2
(45) Date of Patent: Dec. 6, 2022

(54) SYNTHESIZING HIGHER ORDER CONVERSATION FEATURES FOR A MULTIPARTY CONVERSATION

(71) Applicant: BetterUp, Inc., San Francisco, CA (US)

(72) Inventors: Andrew Reece, Berkeley, CA (US); Peter Bull, Berkeley, CA (US); Gus Cooney, Philadelphia, PA (US); Casey Fitzpatrick, Oakland, CA (US); Gabriella Rosen Kellerman, San Francisco, CA (US); Ryan Sonnek, Minneapolis, MN (US)

(73) Assignee: BetterUp, Inc., San Francisco, CA (US)

( * ) Notice: Subject to any disclaimer, the term of this patent is extended or adjusted under 35 U.S.C. 154(b) by 137 days.

(21) Appl. No.: 16/798,246

(22) Filed: Feb. 21, 2020

(65) Prior Publication Data
US 2021/0264921 A1    Aug. 26, 2021

(51) Int. Cl.
*G10L 25/63* (2013.01)
*G10L 15/22* (2006.01)
*G10L 15/32* (2013.01)

(52) U.S. Cl.
CPC .............. *G10L 15/32* (2013.01); *G10L 15/22* (2013.01); *G10L 25/63* (2013.01)

(58) Field of Classification Search
CPC ................................ G10L 15/22; G10L 15/63
See application file for complete search history.

(56) References Cited

U.S. PATENT DOCUMENTS

| | | | |
|---|---|---|---|
| 2002/0101505 A1* | 8/2002 | Gutta | H04N 7/15 348/14.07 |
| 2005/0131744 A1* | 6/2005 | Brown | G06K 9/00315 705/7.29 |
| 2016/0042226 A1* | 2/2016 | Cunico | G06N 5/022 382/103 |
| 2016/0073054 A1* | 3/2016 | Balasaygun | H04L 12/1813 348/14.08 |
| 2018/0070052 A1* | 3/2018 | Nishikawa | H04L 65/403 |
| 2019/0121851 A1* | 4/2019 | Shires | G10L 21/10 |
| 2019/0147852 A1* | 5/2019 | Bakish | G10L 15/063 704/231 |

(Continued)

OTHER PUBLICATIONS

Soleymani, Mohammad, et al. "Asurvey of multimodal sentiment analysis." Image and Vision Computing 65 (2017): 3-14. (Year: 2017).*

(Continued)

*Primary Examiner* — Jialong He
(74) *Attorney, Agent, or Firm* — Kwan & Olynick LLP

(57) ABSTRACT

Technology is provided for identifying synthesized conversation features from recorded conversations. The technology can identify, for each of one or more utterances, data for multiple modalities, such as acoustic data, video data, and text data. The technology can extract features, for each particular utterance of the one or more utterances, from each of the data for the multiple modalities associated with that particular utterance. The technology can also apply a machine learning model that receives the extracted features and/or previously synthesized conversation features and produces one or more additional synthesized conversation features.

21 Claims, 26 Drawing Sheets

(56) References Cited

U.S. PATENT DOCUMENTS

| | | | | |
|---|---|---|---|---|
| 2019/0325202 | A1* | 10/2019 | Wang | H04N 7/155 |
| 2019/0341050 | A1* | 11/2019 | Diamant | H04N 7/155 |
| 2020/0106988 | A1* | 4/2020 | Harpur | H04N 7/15 |
| 2021/0076002 | A1* | 3/2021 | Peters | G06K 9/00718 |

OTHER PUBLICATIONS

"Clmtrackr" <github.com/auduno/clmtrackr> [accessed Mar. 2, 2020].
"CMU-MultimodalSKD" <github.com/A2Zadeh/CMU-MultimodalSDK> [accessed Feb. 25, 2020].
"Cohn-Kanade (CK and CK+) database Download Site" <www.consortium.ri.cmu.edu/ckagree/> [accessed Feb. 25, 2020].
"CREMA-D (Crowd-sourced Emotional Multimodal Actors Dataset)" <github.com/CheyneyComputerScience/CREMA-D> [accessed Feb. 25, 2020].
"DisVoice" <github.com/jcvasquezc/DisVoice> [accessed Mar. 2, 2020].
"Facial Expressions in the Wild Databases and Experimental Protocols" <cs.anu.edu.au/few/AFEW.html> [accessed Feb. 25, 2020].
"Ffmpy: Pythonic interface for FFmpeg/FFprobe command line," <github.com/Ch00k/ffmpy> [accessed Mar. 2, 2020].
"Kaldi Speech Recognition Toolkit" <github.com/kaldi-asr/kaldi> [accessed Mar. 2, 2020].
"Librosa: Python package for audio and music analysis" <github.com/librosa/librosa> [accessed Mar. 2, 2020].
"MELD: A Multimodal Multi-Party Dataset for Emotion Recognition in Conversation" <github.com/SenticNet/MELD> [accessed Feb. 25, 2020].
"MMI Facial Expression Database" <mmifacedb.eu> [accessed Feb. 25, 2020].
"OpenCV on Wheels," <github.com/skvark/opencv-python> [accessed Mar. 2, 2020].
"Real-world Affective Faces (RAF) Database" <www.whdeng.cn/RAF/model1.html#dataset> [accessed Feb. 25, 2020].
"Scikit-video: video processing in python," version 1.1.11, copyright 2015-2017 <www.scikit-video.org/stable/#> [accessed Mar. 2, 2020].
"The Emotional Voices Database: Towards Controlling the Emotional Expressiveness in Voice Generation Systems" <github.com/numediart/EmoV-DB> [accessed Feb. 26, 2020].
"Tracking.js: A modern approach for Computer Vision on the web," <trackingjs.com/> [accessed Mar. 2, 2020].
Amos, Brandon et al. "OpenFace: A general-purpose face recognition library with mobile applications," Jun. 2016, Carnegie Mellon University, Pittsburgh PA, 20 pages. <www.cs.cmu.edu/~satya/docdir/CMU-CS-16-118.pdf>.
Arriaga et al. "Real-time Convolutional Neural Networks for Emotion and Gender Classification," <github.com/petercunha/Emotion/blob/master/demo/report.pdf> retrieved Feb. 26, 2010; 5 pages.
Astorfi, "SpeechPy Official Project Documentation" <github.com/astorfi/speechpy> [accessed Mar. 2, 2020].
AudEERING, "openSMILE" <www.audeering.com/opensmile/> [accessed Mar. 2, 2020].
Baltrusaitis, Tadas et al. "Multimodal Machine Learning: A Survey and Taxonomy," Aug. 1, 2017, 20 pages. <arxiv.org/pdf/1705.09406.pdf>.
Binetti, Nicola et al. "Pupil dilation as an index of preferred mutual gaze duration," 2016 Royal Society Open Science 3: 160086; 11 pages. <royalsocietypublishing.org/doi/full/10.1098/rsos.160086>.
Cambria, Erik et al. "SenticNet 5: Discovering Conceptual Primitives for Sentiment Analysis by Means of Context Embeddings," The Thirty-Second AAAI Conference on Artificial Intelligence 2018, pp. 1795-1802. <sentic.net/senticnet-5.pdf>.
Department of Linguistics, University of California, Santa Barbara. "Santa Barbara Corpus of Spoken American English" 2020. <www.linguistics.ucsb.edu/research/santa-barbara-corpus> [accessed Feb. 26, 2020].

Eyben, Florian et al. "On-line emotion recognition in a 3-D activation-valence-time continuum using acoustic and linguistic cues," J. Multimodal User Interfaces (2010) 3:7-19. <mediatum.ub.tum.de/doc/1289059/576629.pdf>.
Google Inc. "AudioSet" <research.google.com/audioset/> [accessed Feb. 26, 2020].
Gregory et al. "A Nonverbal Signal in Voices of Interview Partners Effectively Predicts Communication Accommodation and Social Status Perceptions," J. Personality Social Psych 1996, V 70, No. 6, 1231-40. <www.columbia.edu/~rmk7/HC/HC_Readings/Gregory.pdf>.
Hannun, Awni et al. "Deep Speech: Scaling up end-to-end speech recognition," Dec. 14, 2014, 12 pages. <arxiv.org/abs/1412.5567> [retrieved Feb. 26, 2020].
Hazarika et al. "ICON: Interactive Conversational Memory Network for Multimodal Emotion Detection," Proc. of 2018 Conference on Empirical Methods in Natural Language Processing, p. 2594-2604, Oct. 31-Nov. 4, 2018, Belgium. <aclweb.org/anthology/D18-1280>.
Hazarika, D. et al. "Conversational Memory Network for Emotion Recognition in Dyadic Dialogue Videos," Proceedings of NAACL-HLT 2018, pp. 2122-2132, New Orleans LA Jun. 1-6, 2018. <aclweb.org/anthology/N18-1193>.
Honma, M. et al. "Perceptual and not physical eye contact elicits pupillary dilation," Jan. 2012, abstract. <www.researchgate.net/publication/51702338_Perceptual_and_not_physical_eye_contact_elicits_pupillary_dilation>.
Hossain, M. Shamim et al. "An emotion recognition system for mobile applications," IEEE Access, Feb. 2017, 7 pages. <www.researchgate.net/publication/313898790>.
Hung and Puthran. "Emotion Detection through Speech," Final Project Documentation CSYE 7374, 9 pages. <github.com/MITESHPUTHRANNEU/Speech-Emotion-Analyzer/blob/master/Emotion%20Detection%20through%20Speech.docx> [retrieved Feb. 26, 2020].
I3.FBK.EU. "DaFEx—a Database of Kinetic Facial Expressions" <i3.fbk.eu/resources/dafex-database-kinetic-facial-expressions> [accessed Feb. 25, 2020].
Imperial College, London. "The SEMAINE database: annotated multimodal records of emotionally coloured conversations between a person and a limited agent" Jan. 2007. <https://semaine-db.eu/accounts/register/> [accessed Feb. 26, 2020].
Kahou et al. "Recurrent Neural Networks for Emotion Recognition in Video," ICMI 2015, Nov. 9-13, 2015, Seattle, WA, 8 pages. <www-etud.iro.umontreal.ca/~michals/pdf/emotion_rnns.pdf>.
Livingstone SR, Russo FA, Apr. 5, 2018. "The Ryerson Audio-Visual Database of Emotional Speech and Song (RAVDESS)" <zenodo.org/record/1188976#.XEevt89KjUI> [accessed Feb. 25, 2020].
Mahoor PhD, Mohammad H. "AffectNet" <mohammadmahoor.com/affectnet/> 2020.
Majumder, N. et al. "DialogueRNN: An Attentive RNN for Emotion Detection in Conversations," May 25, 2019, 8 pages. Association for the Advancement of Artificial Intelligence. <arxiv.org/pdf/1811.00405.pdf>.
Majumder, N. et al. "Multimodal sentiment analysis using hierarchical fusion with context modeling," Jul. 30, 2018, 10 pages. <sentic.net/multimodal-sentiment-analysis-using-hierarchical-fusion.pdf> [retrieved Feb. 26, 2020].
Majumder, N. et al. "Multimodal Sentiment Analysis using Hierarchical Fusion with Context Modeling," Jun. 16, 2018, 28 pages. <arxiv.org/pdf/1806.06228.pdf>.
Microsoft "FERPlus" <github.com/Microsoft/FERPlus> [accessed Feb. 25, 2020].
Mike Boers, "PyAV: Pythonic bindings for FFmpeg's libraries," <github.com/mikeboers/PyAV> [accessed Mar. 2, 2020].
Mishra, Taniya et al. "Word Prominence Detection using Robust yet Simple Prosodic Features," ISCA 13th Annual Conference, Portland OR, Sep. 9-13, 2012, 4 pages. <www.isca-speech.org/archive/archive_papers/interspeech_2012/i12_1864.pdf>.
Mozilla, "Common Voice" <https://voice.mozilla.org/en/datasets> [accessed Feb. 25, 2020].

(56) References Cited

OTHER PUBLICATIONS

Ohio State University, "EmotioNet Challenge 2020 website" <cbcsl.ece.ohio-state.edu/EmotionNetChallenge/> [accessed Feb. 25, 2020].
Patwardhan, Amol. "Three-Dimensional, Kinematic, Human Behavioral Pattern-Based Features for Multimodal Emotion Recognition", Multimodal Technologies and Interact. Sep. 11, 2017; 19 pages. <www.mdpi.com/2414-4088/1/3/19/pdf>.
Poria et a. "MELD: A Multimodal Multi-Party Dataset for Emotion Recognition in Conversations," Jun. 4, 2019, 10 pages. <arxiv.org/pdf/1810.02508.pdf>.
Poria et al. "Context-Dependent Sentiment Analysis in User-Generated Videos," Proc. of 55th Annual Meeting of the Association for Computational Linguistics, pp. 873-883, Vancouver Canada, Jul. 30-Aug. 4, 2017. <www.aclweb.org/anthology/P17-1081>.
Poria, Soujanya et al. "Multi-level Multiple Attentions for Contextual Multimodal Sentiment Analysis," 6 pages. <www.sentic.net/multiple-attentions-for-multimodal-sentiment-analysis.pdf> [retrieved Feb. 26, 2020].
Poria, Soujanya. "A review of affective computing: From unimodal analysis to multimodal fusion," Information Fusion 37 (2017) 98-125. <ww.sentic.net/affective-computing-review.pdf>.
Ravanelli, M. et al. "The Pytorch-Kalki Speech Recognition Toolkit," 2019. <github.com/mravanelli/pytorch-kaldi> [accessed Mar. 2, 2020].
Ravanelli, Mirco et al. "The Pytorch-Kaldi Speech Recognition Toolkit," Feb. 15, 2019, 5 pages. <arxiv.org/pdf/1811.07453.pdf>.
Roddy et al. "Detecting Conversational Gaze Aversion Using Unsupervised Learning," 2017 25th European Signal Processing Conf., pp. 86-90. <www.eurasip.org/Proceedings/Eusipco/Eusipco2017/papers/1570347614.pdf>.
Rogers, Shane L. et al. "Using dual eye tracking to uncover personal gaze patterns during social interaction," Scientific Reports (2018) 8:4271. <www.nature.com/articles/s41598-018-22726-7> published Mar. 9, 2018, 9 pages.
Romero, Daniel M. et al. "Mimicry is Presidential: Linguistic Style Matching in Presidential Debates and Improved Poling Numbers," 2014, 27 pages. <arxiv.org/pdf/1508.01786.pdf>.
Sahay, Saurav et al. "Multimodal Relational Tensor Network for Sentiment and Emotion Classification," Proceedings of Fist Grand Challenge on Human Multimodal Language, p. 20-27, Australia Jul. 20, 2018. <www.aclweb.org/anthology/W18-3303>.
Satt et al. "Efficient Emotion Recognition from Speech Using Deep Learning on Spectrograms," Interspeech Aug. 20-24, 2017, Stockholm Sweden, pp. 1089-1093. <pdfs.semanticscholar.org/de47/fc09bc8dcd032c8b3450a0b2a816c376e07e.pdf>.
Schrammel, Franziska et al. "Virtual friend or threat? The effects of facial expression and gaze interaction on psychophysiological responses and emotional experience," Psychophysiology 46 (2009), 922-931. <www.ncbi.nlm.nih.gov/pubmed/19470127>.
Tripathi, Samarth, "Multi-Modal Emotion Recognition on IEMOCAP with Neural Networks," Nov. 6, 2019, 5 pages. <arxiv.org/pdf/1804.05788.pdf>.
Trustees of the University of Pennsylvania 1996. "Boston University Radio Speech Corpus" <catalog.ldc.upenn.edu/LDC96S36> [accessed Feb. 26, 2020].
Trustees of the University of Pennsylvania. "Emotional Prosody Speech and Transcripts" Jul. 23, 2002. <catalog.ldc.upenn.edu/LDC2002S28> [accessed Feb. 26, 2020].
Tyiannak, pyAudioAnalysis, "A Python library for audio feature extraction, classification, segmentation and applications," <github.com/tyiannak/pyAudioAnalysis> [accessed Mar. 2, 2020].
University of Surrey, "Surrey Audio-Visual Expressed Emotion (SAVEE) Database" Apr. 2, 2015. <kahlan.eps.surrey.ac.uk/savee/Download.html> [accessed Feb. 25, 2020].
UT Dallas MSP Multimodal Signal Processing Laboratory. "MSP—Improv corpus: An emotional audiovisual database of spontaneous improvisations". <ecs.utdallas.edu/research/researchlabs/msp-lab/MSP-Improv.html> [accessed Feb. 25, 2020].
Ververidis, Dimitrios et al. "A State of the Art Review on Emotional Speech Databases," 2003, 11 pages. <poseidon.csd.auth.gr/papers/PUBLISHED/CONFERENCE/pdf/Ververidis2003b.pdf>.
Wu, Chung-Hsien et al. "Survey on audiovisual emotion recognition: databases, features, and data fusion strategies," 2014, 18 pages. <https://www.cambridge.org/core/services/aop-cambridge-core/content/view/S2048770314000110>.
Yang, Xitong et al. "Deep Multimodal Representation Learning from Temporal Data," Apr. 11, 2017, 9 pages. <arxiv.org/pdf/1704.03152v1.pdf>.
Zadeh, Amir et al. "Memory Fusion Network for Multi-view Sequential Learning," Feb. 3, 2018, 9 pages. <arxiv.org/pdf/1802.00927.pdf>.
Zadeh, Amir et al. "Tensor Fusion Network for Multimodal Sentiment Analysis," Jul. 23, 2017, 12 pages. <arxiv.org/pdf/1707.07250.pdf>.
Zhang "Appearance-based Gaze Estimation in the Wild (MPIIGaze)", Max-Planck-Institut, 2015. <mpi-inf.mpg.de/departments/computer-vision-and-multimodal-computing/research/gaze-based-human-computer-interaction/appearance-based-gaze-estimation-in-the-wild/>.
Zhang et al. "Attention Based Fully Convolutional Network for Speech Emotion Recognition," May 2, 2019, 5 pages. <arxiv.org/pdf/1806.01506.pdf>.

* cited by examiner

SYNTHESIZING HIGHER ORDER CONVERSATION FEATURES FOR A MULTIPARTY CONVERSATION

CROSS REFERENCE TO RELATED APPLICATIONS

This application is related to the following United States patent applications: U.S. patent application Ser. No. 16/798,242, filed on Feb. 21, 2020, and entitled "DETERMINING CONVERSATION ANALYSIS INDICATORS FOR A MULTIPARTY CONVERSATION"; U.S. patent application Ser. No. 16/798,244, filed on Feb. 21, 2020, and entitled "SEGMENTING AND GENERATING CONVERSATION FEATURES FOR A MULTIPARTY CONVERSATION"; and U.S. patent application Ser. No. 16/798,248, filed on Feb. 21, 2020, and entitled "COMPUTATIONALLY REACTING TO A MULTIPARTY CONVERSATION,"; the disclosures of which are hereby incorporated herein in their entireties by reference.

TECHNICAL FIELD

The present disclosure is directed to a machine learning system for determining conversation analysis indicators using acoustic, video, and text data of a multiparty conversation.

BACKGROUND

As technology becomes more integrated into people's lives, humans are generating massive amounts of recordings with acoustic and video data. Some systems can analyze various aspects of this acoustic and video data. For example, spoken acoustic data may be programmatically transcribed into text data using a recurrent neural network system. As another example, faces may be identified in video data using a convolutional neural network system.

Some areas in which recordings are being created are workplaces and digital, remote collaborations. These recordings hold a wealth of information about interactions between users. For example, employees and digital workplaces frequently participate in Internet-based videoconference meetings. These videoconference meetings generate rich acoustic and video data.

Despite this available information, it is very difficult to sort through and leverage recordings to develop employee skills through coaching relationships. Yet, effective coaching is a key component of long-term organization success, especially in the face of geographically distributed workforces. However, this same distribution may inhibit coaching to develop professional skills.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
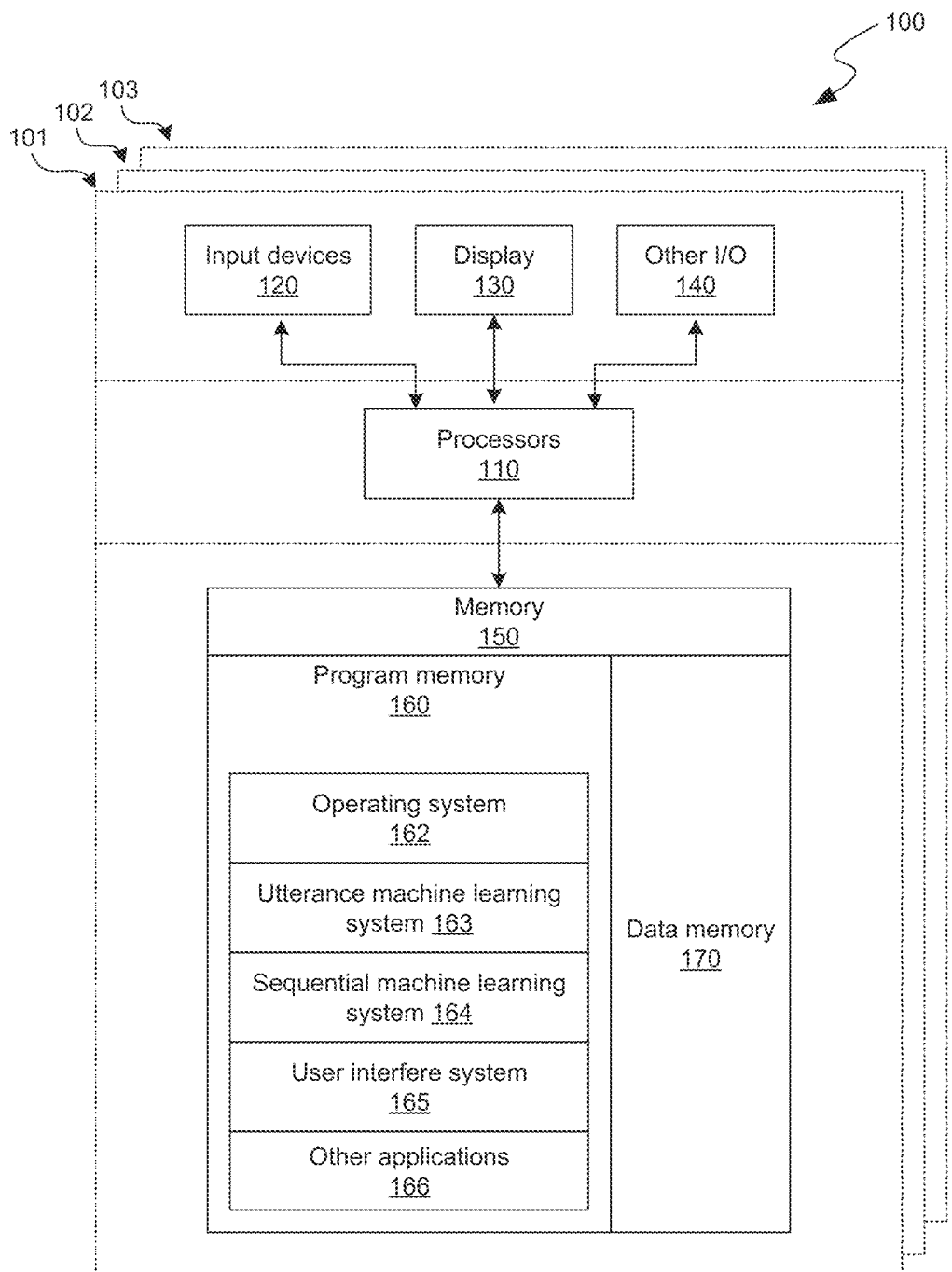
FIG. 1 is a block diagram illustrating an overview of devices on which some implementations of the disclosed technology can operate.

Implementations for a machine learning system for determining conversation analysis indicators using acoustic, video, and text data of a multiparty conversation are provided. In the example implementation, the machine learning system analyzes multiple data modalities of a multiparty conversation to determine conversation analysis indicators.

As used herein, a multiparty conversation refers to acoustic/video data depicting at least two people having a verbal conversation. In one implementation, acoustic/video data may be recorded at a single point, such as a camera capturing an in-person conversation. In another implementation, the acoustic/video data may be recorded at multiple points by multiple devices. For example, multiple users may participate in an Internet-based videoconference. The acoustic/video data transmitted as a component of the videoconference may be recorded to facilitate further analysis. More specifically, a webcam device may individually record each participant in the conference. The acoustic/video streams for each participant may be aggregated or analyzed individually.

In one particular implementation, multiple coaching conversations occur between at least two participants, such as a coach and mentee. A mentee may also be referred to as a user or speaker in a particular conversation. A coach may also be referred to as a coach, or as a user/speaker in a conversation. These coaching conversations may occur via videoconference. The rich acoustic/video data generated by the videoconference can be analyzed to quantify the underlying coaching relationship, and guide further developments in the relationship. For example, the effectiveness of the coach may be identified, and further effectiveness of scores may be determined to identify areas for improvement. Additionally, the mentee may be evaluated. For example, the communication skills of the mentee can be evaluated by performing computational methods (e.g., neural network based analysis) on the acoustic/video data. Tracking these conversation analysis indicators throughout an individual conversation, and across multiple conversations, may encourage skill development in the coach and the mentee.

A conversation analytics system is provided to programmatically analyze the acoustic, video, and text data from a multiparty conversation (e.g., a recording of a teleconference coaching session). The conversation analytics system preprocesses all of the data modalities (e.g., acoustic, video, text) associated with the multiparty conversation, and further applies a multimodal and sequential machine learning system to synthesize data across the data modalities and across time segments of the multiparty conversation (e.g., across utterances of each party). As used herein, a multimodal machine learning system can be one or more models trained to receive input in different modalities, either as a single model or a combination of models for the various modalities, to produce data indicative of a goal (e.g., minimizing a loss function). As further used herein, a sequential machine learning system can be one or more models trained to receive input, including data based on a previous iteration of applying the sequential machine learning system (except for a first execution where no previous execution occurred), to produce data indicative of a goal (e.g., minimizing a loss function). In some cases, sequential machine learning systems are also referred to as "recurrent" models, but can be any type of model where the model output is based on at least 1) input for a current item in a series and 2) input based (either as an internal model state or stored output from a previous model execution) on one or more previous items in a series. In some implementations, sequential machine learning systems can have multimodal components. For example, a multiparty conversation can be segmented into utterances, and data for multiple modalities can be generated for each utterance. For each utterance, data for each modality of that utterance can be provided to a model trained for the modality (e.g., producing video-based output, acoustic-based output, etc.), which can be combined into utterance output. The utterance output can be input to a sequential model, which can also receive its own output from processing one or more previous utterance outputs from the multiparty conversation, to generate conversation analysis indicators.

The output of the conversation analytics system is conversation analysis indicators, which can be visualized and/or mapped to actions. For example, the conversation analytics system may identify a disengaged mentee, and generate a notification to the mentee. As another example, the conversation analytics system may identify a high frequency of utterances by the coach, and further track this metric over time. This data can be effective in training a coach to reduce interruptions, and thus develop their coaching skills.

In the example implementation, the conversation analytics system analyzes the data modalities individually before applying a sequential machine learning system. In one implementation, gaze tracking, facial expression recognition, and posture identification machine learning algorithms may be applied to the video data modality. Notably, these algorithms may be applied to each party in the conversation, and further correlated to determine interactions between these features. For example, a coach may make a facial expression in response to a change in posture by the mentee. The conversation analytics system coordinates the application of these machine learning algorithms between multiple participants for higher-level analysis of the conversation. Additionally or alternatively, speech pattern, pitch, tone, and verbal pacing algorithms may be applied to the acoustic data, to generate similar feature (i.e., computationally identified properties) data for the acoustic modality.

In one implementation, the conversation analytics system is configured to automatically generate a transcript based on the acoustic/video data. For example, automated transcription software packages may be implemented. In another implementation, the conversation analytics system may be configured to retrieve a transcript of the conversation from a transcription service. The conversation analytics system is configured to apply natural language processing algorithms to the text data. In one implementation, conversation keywords, interruptions, topic changes, questions, use of passive voice, and so on, may be identified.

The conversation analytics system includes a sequential machine learning system. In the example implementation, the sequential machine learning system adds an internal state/memory component to a traditional neural network system. For example, the sequential machine learning system may include a recurrent neural network configured to generate outputs based on both input data and an internal state of the recurrent neural network. The internal state of the recurrent neural network is updated based on each output generated, so that the internal state tracks recent events and features present in the input data. Recurrent neural networks are particularly suited to analyzing sequential inputs, such as utterances in a conversation.

As used herein, an utterance refers to a particular verbalized statement made by a participant in the conversation. For example, utterances include sentences and phrases. Utterances further include less structured vocalizations, such as "uh" and "um." Utterances may also include incomplete statements and statements interrupted by other participants. In the example implementation, the conversation analytics system is configured to automatically segment conversations into utterances, based on statements and the associated speaker. In other implementations, the conversation analytics system may receive segmented utterances that are components of a conversation.

The sequential machine learning system sequentially processes utterances to generate conversation analysis indicators (e.g., coaching statistics, emotional labels). Conversation analysis indicators may be generated after each utterance to track the state of the conversation over time. This sequence of indicators may be graphed, otherwise visualized, and analyzed as a whole.

The conversation analytics system provides a user interface for users to interrogate the conversation analysis indicators. In the example implementation, a coach/mentee user interface may be provided to track the effectiveness of a coaching relationship across multiple conversations. The conversation analytics system may further provide notification/alerts based on changes in the conversation analysis indicators. For example, a decline in the conversation analysis indicators may trigger an alert to the coach.

Several implementations of the conversation analytics system are discussed in more detail below, in reference to the figures.

FIG. 1 is a block diagram illustrating an overview of devices on which some implementations of the disclosed technology can operate. As discussed in greater detail below, the devices can comprise hardware components of a computing system 100 that performs one or more of: 1) providing interfaces for human or automatic first level conversation features for a multiparty conversation; 2) synthesizing additional conversation features for the conversation using machine learning techniques, 3) conversation analysis using a sequential machine learning system, and 4) providing interfaces and mappings to determine actions to take based on the conversation analysis from the sequential machine learning system. Computing system 100 can include one or more input devices 120 that provide input to the processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

In various implementations, computing system 100 can include a single computing device 103 or multiple computing devices (e.g., computing device 101, computing device 102, and computing device 103) that communicate over wired or wireless channels to distribute processing interior input data. In some implementations, computing system 100 can include standalone devices capable of conversation analysis. In other implementations, computing system 100 can include multiple computing devices, such as server computing, coach user device, mentee user device, annotator, and so on. Example computing devices are further described in relation to FIG. 2.

Processors 110 can be a single processing unit or multiple processing units in a device or distributed across multiple devices (e.g., distributed across two or more computing devices 101-103). Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, acoustic card, USB, firewire or other external device, camera, printer, speakers, CD-ROM drive, DVD drive, disk drive, or Blu-Ray device.

In some implementations, the computing system 100 also includes a communication device capable of communicating wirelessly or wire-based with a network node. The communication device can communicate with another device or a server through a network using, for example, TCP/IP protocols. Computing system 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, utterance machine learning system 163, sequential machine learning system 164, user interface system 165, and other application programs 166. Memory 150 can also include data memory 170, e.g., data associated with a multiparty conversation (e.g., acoustic data, text data, video data), conversation features (also referred to herein as "labels" or "label data"), machine learning modules, mappings of conversation score data to actions or inferences, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
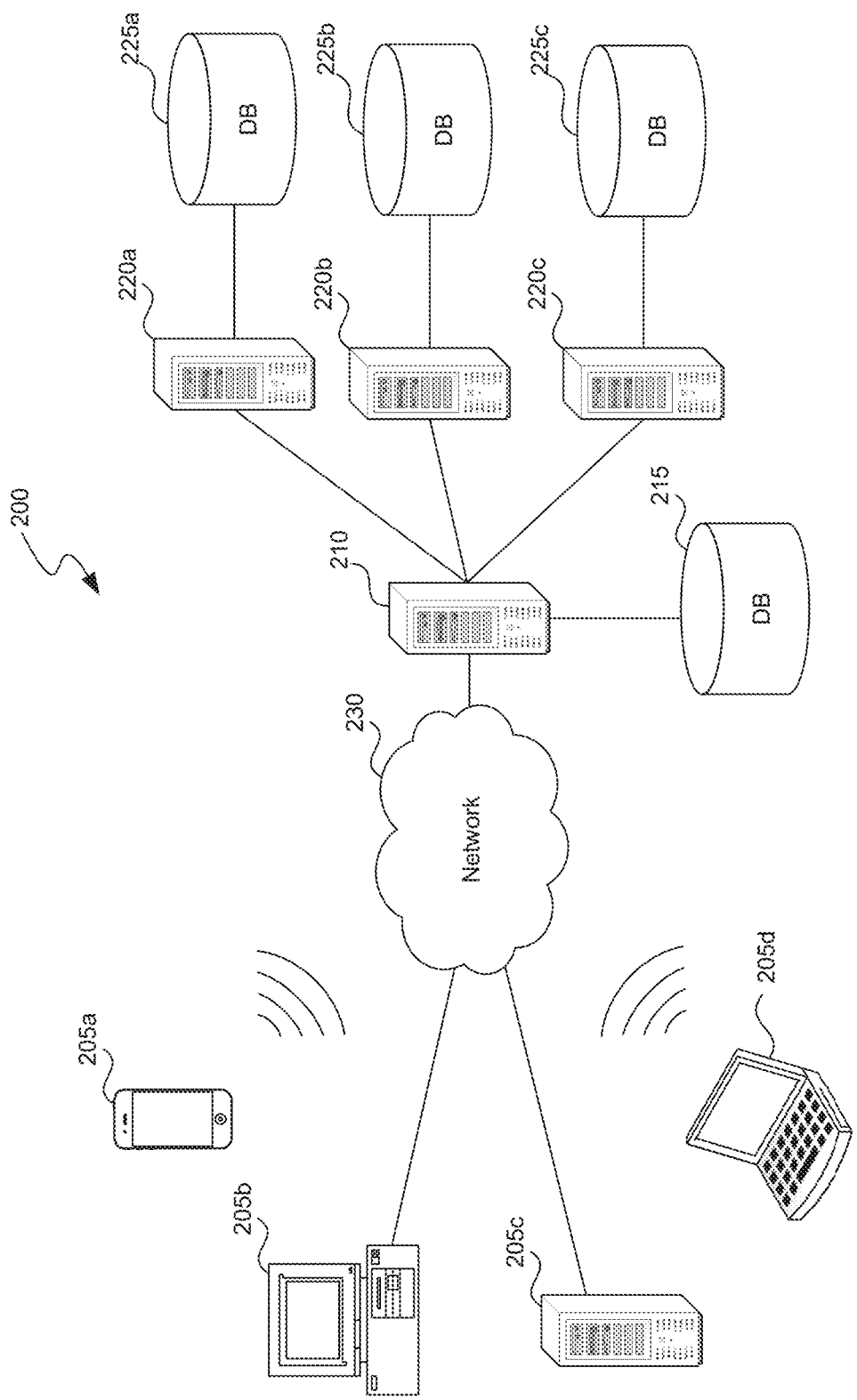
FIG. 2 is a block diagram illustrating an overview of an environment in which some implementations of the disclosed technology can operate.

FIG. 2 is a block diagram illustrating an overview of an environment 200 in which some implementations of the disclosed technology can operate. Environment 200 can include one or more client computing devices 205A-D, examples of which can include computing system 100. Client computing devices 205 can operate in a networked environment using logical connections through network 230 to one or more remote computers, such as a server computing device.

In one implementation, client computing device 205a is a mentee user device including a user-facing camera and microphone. Client computing device 205a is configured to establish a videoconference connection with at least one other client computing device, such as client computing device 205b. Client computing device 205b is, in the example mentioned, a coach user device including a user-facing camera and microphone. Client computing device 205a and client computing device 205b can communicate directly using network 230, and/or through server computing devices 210 and 220. Server computing devices 210 and 220, further described below, may be configured to record videoconferences occurring between client computing devices 205A-D. Client computing device 205d can include an annotator, configured to annotate utterances. In one implementation, client computing device 205D includes a user interface configured for annotating/labeling utterances with conversation analysis indicators, as described in FIG. 6.

In some implementations, server 210 can be an edge server which receives client requests and coordinates fulfillment of those requests through other servers, such as servers 220A-C. Server computing devices 210 and 220 can comprise computing systems, such as computing system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have its own database. Databases 215 and 225 can warehouse (e.g., store) information, such as user profiles (e.g., coach/mentee profiles), conversation analysis indicators, and/or conversation data (e.g., acoustic data, video data, text data). Though databases 215 and 225 are displayed logically as single units, databases 215 and 225 can each be a distributed computing environment encompassing multiple computing devices, can be located within its corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
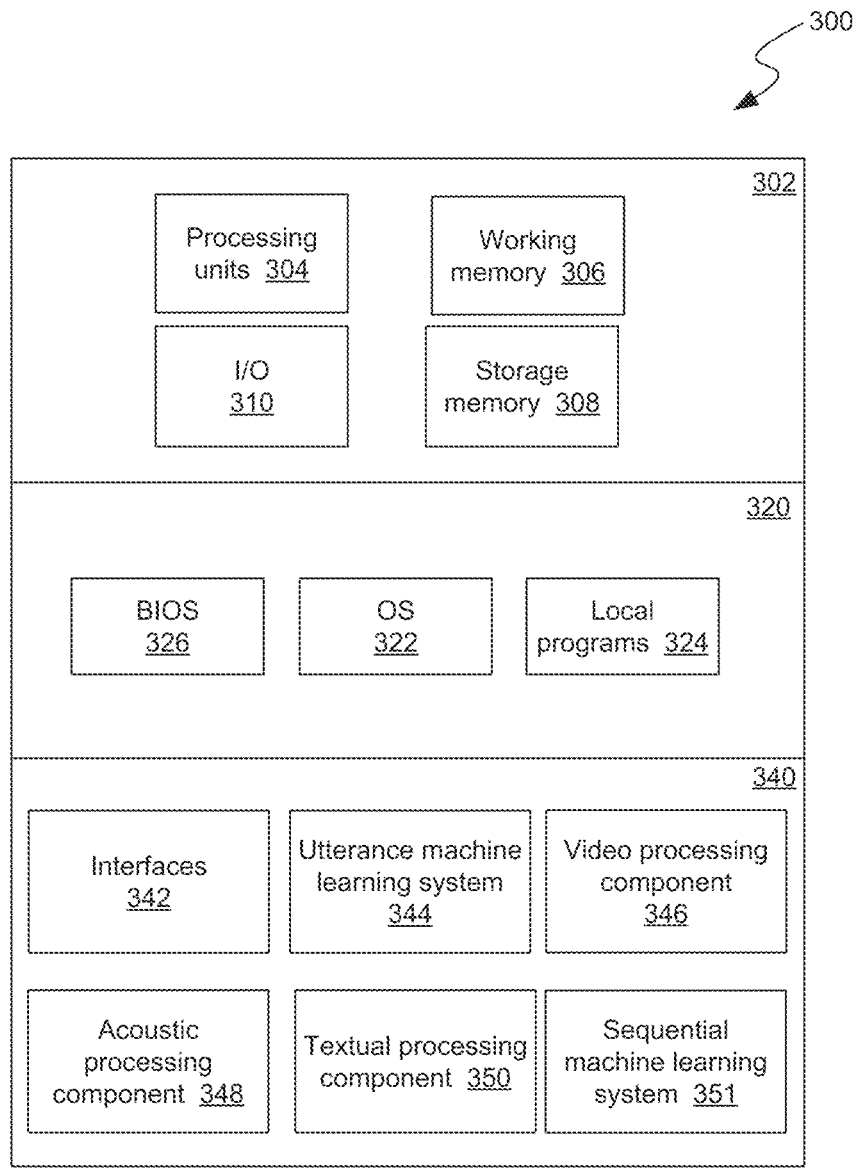
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device, such as client computing devices 205 or on a server computing device, such as server computing device 210 or 220.

General software 320 can include various applications including an operating system 322, local programs 224, and a basic input output system (BIOS) 326. Specialized components 340 can be subcomponents of a general software application 320, such as local programs 224. Specialized components 340 can include utterance machine learning system 344, video processing component 346, acoustic processing component 348, textual processing component 350, sequential machine learning system 351, and components that provide user interfaces, transfer data, and control the specialized components, such as interfaces 342. In some implementations, components 300 can be in a computing system that is distributed across multiple computing devices or can be an interface to a server-based application executing one or more of specialized components 340.

Video processing component 346 can extract the video data from a conversation or utterance from a conversation and can encapsulate it as a conversation feature for use by a machine learning system. For example, the video data can be converted into a series of pixel data frames or histograms and/or deltas for transitions between frames. Video processing component 346 can also extract other conversation features from the video data, such as facial expressions, body postures or gestures, eye gaze directions, etc. These additional synthesized conversation features may be extracted by a human or computationally using either or both of an algorithm or machine learning model at an annotator, as discussed below.

Acoustic processing component 348 can extract the audio data from a conversation or utterance from a conversation and can encapsulate it as a conversation feature for use by a machine learning system. For example, the audio data can be converted into wave forms, sequences of identified sounds, etc. Audio processing component 346 can also extract other conversation features from the audio data, such as audio features such as tone, volume, pitch, mel-frequency cepstral coefficients, chroma, etc. These additional synthesized conversation features may be extracted by a human or computationally using either or both of an algorithm or machine learning model at an annotator, as discussed below.

Textual processing component 350 can transcribe the audio from a conversation or utterance from a conversation into text and encapsulate it as a conversation feature for use by a machine learning system. For example, the textual data can be converted into vector embeddings of words or phrases. Textual processing component 346 can also extract other conversation features from the textual data, such as identifications of significant words or phrases, e.g., identified at an annotator, as discussed below.

Utterance machine learning system 344 can receive a conversation and segment it into one or more utterances. Utterance machine learning system 344 can accomplish this based on the audio, video, and/or textual data of a conversation, either directly or after being processed by video processing component 346, acoustic processing component 348, and/or textual processing component 350. For example, utterance machine learning system 344 can use a machine learning model trained to determine user utterances based on human segmented conversations as training data.

Sequential machine learning system 351, can receive, for a sequence of utterances identified by utterance machine learning system 344, the conversation features as identified by the video processing component 346, acoustic processing component 348, and/or textual processing component 350 (and corresponding annotators for synthesized conversation features). Sequential machine learning system 351 can then apply machine learning pipelines for each modality of conversation feature, combine the results for the modalities into an output for the utterance, combine the utterance output for a time window with other utterance output for the same time window into a speaker feature, and then apply the resulting sequence of speaker features that result from the entire conversation to a sequential machine learning system that updates an internal state as each successive speaker feature is applied. This can produce a conversation analysis indicator, which can be mapped to one or more actions to take or inferences for the conversation (e.g., a set of conversation analysis indicators can be mapped to a score for the conversation, emotional characteristics for the conversation, effectiveness of the conversation, etc.).

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
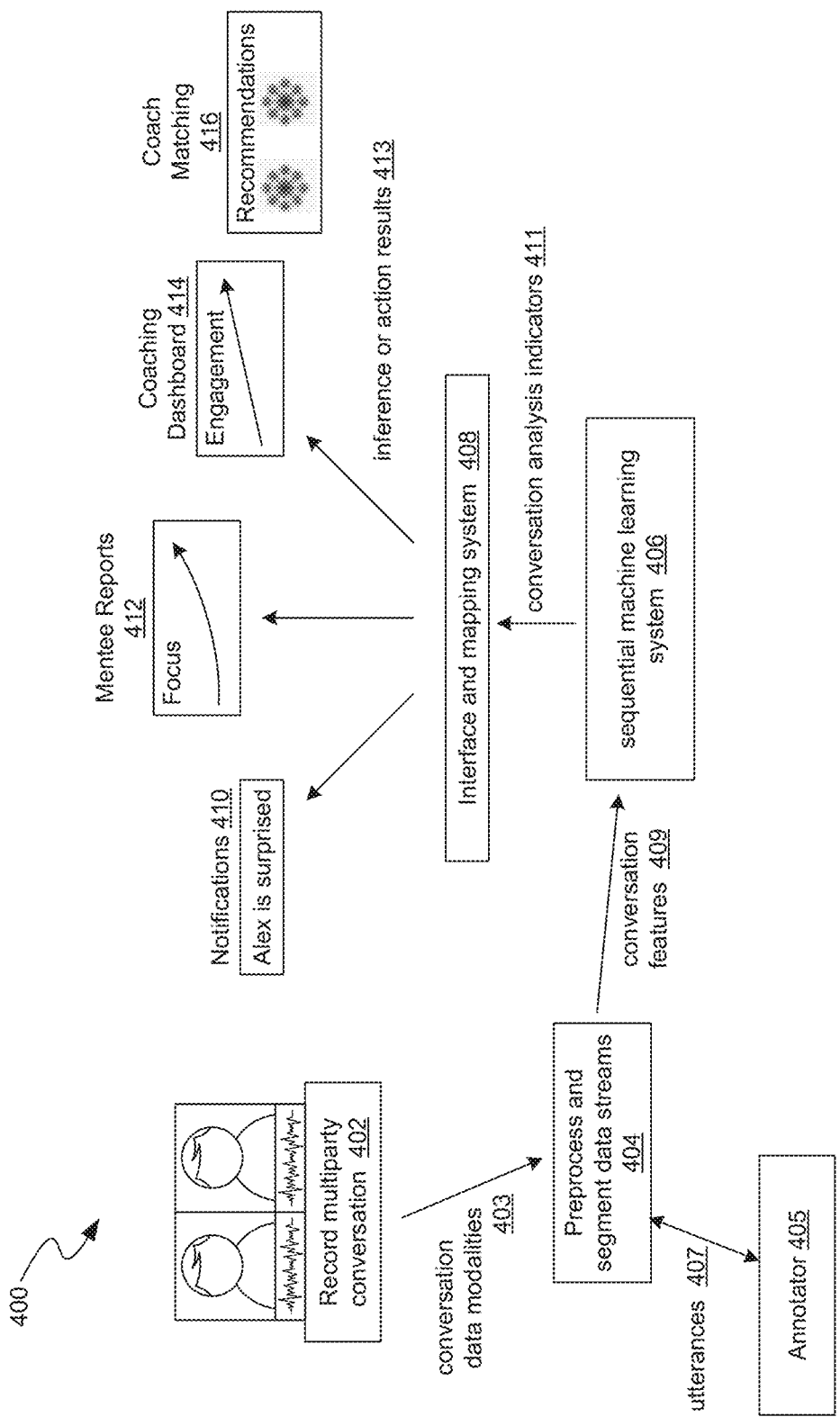
FIG. 4 illustrates a conversation analytics system with interfaces for human or machine learning data identifications of first level and synthesized conversation features for a multiparty conversation, conversation analysis using sequential machine learning, and interfaces and mappings to determine actions to take based on sequential machine learning results.

FIG. 4 illustrates a conversation analytics system with interfaces for human and/or machine learning data first level and synthesized conversation features for a multiparty conversation, conversation analysis using sequential machine learning, and interfaces and mappings to determine actions to take based on sequential machine learning results. Conversation analytics system 400 includes block 402, recording a multiparty conversation. For example, conversation analytics system 400 may include recording a web-based videoconference between two or more users, capturing acoustic and video data. In the example implementation, block 402 includes recording a multi-participant coaching conversation (e.g., a coaching conversation between a coach and a mentee). Analytics system 400 may be configured to analyze conversations with any number of participants. Conversation analytics system 400 may record the conversation in real time or retrieve a stored conversation. Conversation analytics system 400 may be configured to retrieve and/or automatically generate a transcription of the conversation, based on the acoustic and video recordings. This text data may include timestamps to align the transcript with the acoustic and video data.

At block 404, conversation analytics system 400 preprocesses acoustic, video, and text data streams. More specifically, block 404 accepts input of the conversation data modalities (e.g., audio, video, text) recorded/retrieved at block 402 and segments the conversation into individual utterances ("utterance segments") which are associated with the labeled conversation features (discussed below). Each utterance is defined by a verbal statement associated with at least one participant in the conversation, and includes the applicable acoustic, video, and text data. In other words, each utterance is a segment of the overall conversation from block 402. In the example implementation, conversation analytics system 400 segments the conversation into utterances based on phrases or statements made by users. In other implementations, utterances may be segmented based on words, speakers, predefined time frames, time windows, time stamps, conversation sessions (the recorded conversation can include one or more different conversation sessions), and so on.

Multiple utterances may overlap. In other words, a particular section of a conversation may be associated with multiple utterances, for example, when multiple participants are talking at once. The data modalities (e.g., text, acoustic, video) associated with the utterances may have the same time window or time segment. Further, conversation analysis indicators (discussed below) may also have the same time window. Time windows, time segments, timestamps, etc., may be used to correlate between utterances, utterance output data, recorded multiparty conversations (e.g., audio/video data). Additional details on segmenting a conversation are provided below, inter alia, in relation to FIG. 10, block 1104 of FIG. 11, FIG. 12, block 1304 of FIG. 13, block 1444 of FIG. 14, and block 1906 of FIG. 19.

The segmented utterances from block 404 can be passed to annotator 405. Annotator 405 can identify conversation features through interfaces where humans identify the conversation features, algorithms for identifying conversation features, and/or machine learning modules trained to identify conversation features. The conversation features can be first level (e.g., directly obtainable from the data modalities of an utterance) or synthesized (e.g., requiring the combination of one or more first level conversation feature and/or other synthesized conversation features). For example, the conversation features can include an embedding of the audio, video, or textual versions of the audio, tone, sound level, emotional characteristics (e.g., supportive, agreeable, combative, engaged, enthusiastic, passionate, uncertainty, etc.), effectiveness ratings, physical reactions or movements (e.g., eye gaze directions, participant postures, participant gestures, participant head positions, laughter, nodding, facial expressions, etc.); and/or identify particular significant phrases or word choices (e.g., mm-hmm, yes, yah, oh my god, huh, uhh, etc.), segment turn length, gaps or delays in speaking, sentence length, topic choice, who is choosing the topics, shared knowledge, mistakes or self-corrections, active listening, use of humor, participant biometrics, etc. Annotator 405 may implement any combination of machine learning systems to generate the conversation features. In some implementations, a user interface provided by annotator 405 can also allow a user to perform additional actions such as collaborating with other users on reviewing and annotating multiparty conversations or modifying automatically determined utterance segments.

Additional details on generating conversation features are provided below, inter alia, in relation to FIG. 5, block 712 of FIG. 7, blocks 802-814 of FIG. 8, FIG. 11, FIG. 12, blocks 1308-1312 of FIG. 13, blocks 165, 1448, and 1450 of FIG. 14, blocks 1506-1510 of FIG. 15, FIGS. 16-18, and blocks 1910-1914 of FIG. 19.

At block 406, conversation analytics system 400 determines conversation analysis indicators. In some implementations, conversation analysis indicators can be one or more scores for the entire conversation or parts of the conversation, such as an overall effectiveness or quality rating for the conversation or parts of the conversation. In some cases, the conversation analysis indicators can include other values, such as values indicating the emotional content, engagement, genuineness, intensity, etc., for all or parts of the conversation. The conversation analysis indicators can be generated by applying a sequential machine learning system to the conversation features for each utterance, such that a video processing part of the machine learning system is applied to the conversation features from the video modality data, an acoustic processing part of the machine learning system is applied to the conversation features from the acoustic modality data, and a textual processing part of the machine learning system is applied to the conversation features from the text modality data. The output from each of these parts of the machine learning system can be combined further by a combination engine to generate output for that utterance. This process can be repeated for each utterance in the conversation. The output for the sequences of utterances in a time window (e.g., where utterances overlap or for a set time period such as 5 seconds) can be combined into combined speaker features for the time window of the conversation. The sequence of sets of combined speaker features, each set corresponding to a time window, for the conversation can be provided in sequence to a sequential part of the machine learning system which can generate scores for the conversation as a whole or for various subsections of the conversation. For example, the sequential machine learning system can sequentially process utterances while maintaining an event history (e.g., an internal state) throughout the conversation. In other words, the sequential machine learning system considers both an input utterance and an internal state of the sequential machine learning system when determining conversation analysis indicators. Conversation analysis indicators may be determined after each utterance, to track features of the conversation over time.

The machine learning system can be trained based on label data received from annotator 405. For example, the sequential machine learning system may be trained on manually generated label data for conversations, where an annotator has identified conversation features such as facial expressions, interruptions, engagement, openness, and so on with corresponding conversation analysis indicators. In other words, an annotator may manually generate label data for sample/training conversations at annotator 405. This training process configures conversation analytics system 400 to determine conversation analysis indicators at block 406.

In some implementations, conversation analytics system 400 generates multiple conversation analysis indicators (e.g., conversation scores, conversation analysis indicators, openness scores, engagement scores, ownership scores, goal scores, interruptions scores, "time spent listening" scores, and emotional labels) at block 406. For example, multiple instances of a machine learning system may be individually trained to each generate a specific conversation analysis indicator. These conversation analysis indicators are collected into conversation analysis indicators 411 and passed on to block 408. In other words, conversation analysis indicator 411 can include a single score or multiple scores/indicators for a particular conversation.

Additional details on training and applying a machine learning system to conversation features are provided below, inter alia, in relation to FIGS. 5-9, FIG. 6, block 2004 of FIG. 20, and block 2604 of FIG. 26.

At block 408, conversation analytics system 400 can apply a mapping of conversation analysis indicators to inferences or actions to determine inference or action results. In various implementations, the mapping can provide different mappings of conversation analysis indicators to inferences or actions for different purposes. For example, the mapping can map to inferences about the content of the conversation which can be filled into various types of reports or notifications, the mapping can supply actions for suggestions to make for changing coaching match-up, etc.

In some implementations, the conversation analysis indicators can be compared to conversation analysis indicators from previous conversations to identify a progress score. In some embodiments, the mapping can specify thresholds for progress scores that map to actions for providing a notification or alert of a low quality paring between the conversation participants (e.g., coach and mentee), e.g., using notifications 410. In some cases, the progress score can be tracked over time and stored in a user profile and the mapping can provide inferences such as a whether the progress score falls within a valid range or meets progress goals or benchmarks. In some implementations, a series of the progress scores can be used to generate a progress score forecast, e.g., by fitting a function to the series of progress scores.

In some implementations, wherein the conversation analysis indicators include a series of instant scores, comparison scores can be determined at multiple points throughout the duration of the conversation. The mapping can include a rule to identify when there is a threshold difference between instant scores, which can correspond to various inferences to label the changes, e.g., as a change in emotional levels, engagement, focus, etc. In some implementations, an inference can be identified based on a change in instant scores above a threshold. For example, the change above the threshold can signify a training moment, which can be further mapped to an action to identify the training moment for a coach and/or mentee. More specifically, the system can prompt the coach and/or mentee to review the conversation (either alone or as a team), and provide with the prompt a subsegment of the recorded conversation with one or more corresponding inference labels. In some implementations, the training moments can be labeled as high points or low points in the conversation or a segment of the conversation. In some implementations, identifying a training moment as a high or low point can include applying yet another machine learning module trained to identify conversation high and low points based on human labeled data. In some implementations, the system 400 can operate as the conversation progresses live. The system can map a change in instant scores above a threshold to an action to provide an alert to one or both users, e.g., using notifications 410.

In some implementations, the conversation analysis indicators can be mapped to inferences or actions for comparing or updating a match between a mentee and a coach, e.g., using coach matching 416. For example, the conversation analysis indicators can include values such as for a "staying on goal" metric, an interruptions metric, and a "time spent listening" metric, etc., and the mapping can map one or more combinations of these conversation analysis indicators to a coaching score or match score. The coaching score can then be provided to users to indicate a value of the coaching from the conversations or can be used to select a better coach for the mentee, and/or the match score can be used to indicate a level of match between the coach and mentee.

In some implementations, the conversation analysis indicators can be mapped to coaching suggestion inferences or actions providing the coach suggestions on topics, coaching materials, engagement techniques, etc., to better engage with the mentee or improve coaching.

The interfaces of block 408 can generate various visualizations of the conversation analysis indicators. For example, a mentee may view, in mentee reports 412 via a web application, a conversation impact score, an overall composite score, an excitement score, an agreement score, a progress score, instant scores, coaching scores, match scores, etc. In some implementations, one or more of these scores can be provided in a mentee report with corresponding explanations and/or a baseline or comparison value so the mentee can interpret the values in terms of their progress, goals, or as a comparison to other mentees. Similarly, system 400 can include a coaching dashboard, e.g., as another web application, to show individual mentee scores, combinations of mentee scores, coaching or matching scores, coaching suggestion inferences or actions, etc.

Additional details on applying a mapping of the conversation analysis indicators to inferences or actions to determine inference or action results and reacting to the conversation according to the inference or action results are provided below, inter alia, in relation to FIGS. 20-26.

Figure 5:
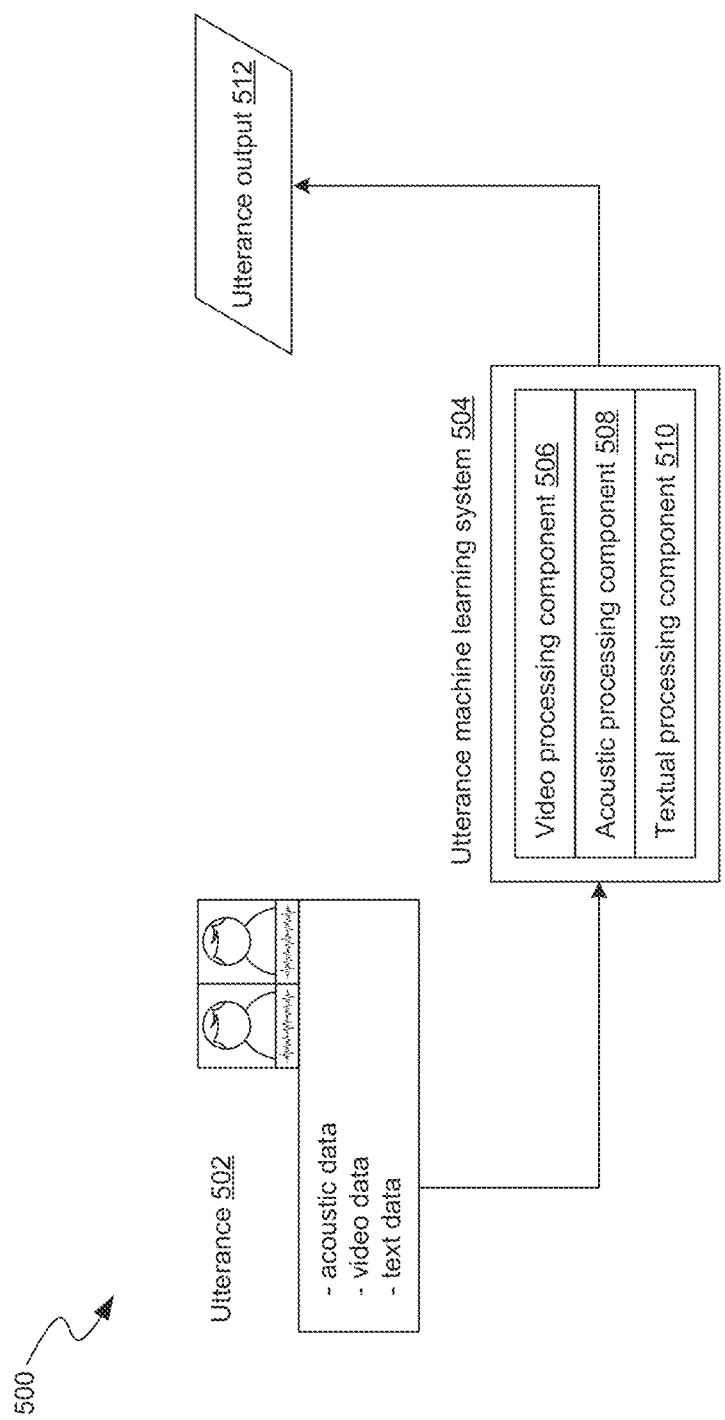
FIG. 5 illustrates a machine learning system for preprocessing an utterance.

FIG. 5 illustrates machine learning system 504 preprocessing utterance 502 to generate utterance output 512. Utterance 502 represents a segment of a conversation between at least two users (e.g., a coach and a mentee). In the illustrated implementation, utterance 502 includes acoustic data, video data, and text data. For example, utterance 502 may include acoustic and video data of a user captured by a camera (e.g., laptop webcam). The text data corresponds to the words spoken in the acoustic data. In the example implementation, the text data is generated based on the acoustic and/or video data, using a transcription service or software package. In alternate implementations, conversation analytics system 400 may be configured to generate the text data by transcribing the acoustic/video data using algorithmic methods (e.g., neural networks).

Machine learning system 504 generates utterance output 512 based on utterance 502. In the illustrated implementation, machine learning system 504 is a neural network system, including individual neural network components. Utterance output 512 is a computational representation of features identified from utterance 502, and is an intermediate result used for further processing, as described in FIG. 6.

Machine learning system 504 may include multiple machine learning sub-components, such as individual neural networks. In the example implementation, machine learning system 504 includes video processing component 506, acoustic processing component 508, and textual processing component 510. Utterance output 512 includes the concatenated output data of video processing component 506, acoustic processing component 508, and textual processing component 510.

In the example implementation, video processing component 506 includes a recurrent neural network. Video processing component 506 is configured to sequentially process the frames to generate video feature output. Video processing component 506 utilizes a recurrent neural network (e.g., a neural network including long short-term memory cells). In other words, the video processing component keeps a running history (e.g., internal state) of previous events in the video, as the video is sequentially processed.

As used herein, neural network includes LSTM neural networks. LSTM neural networks include at least one LSTM cell. In the example implementation, LSTM cells include a memory component, and three input/output gates. The gates include an input gate, an output gate, and a forget gate. The input gate defines how the memory component is modified by an input. The output gate defines how the value stored in the memory component controls the activation of other nodes in the neural network. The forget gate defines the extent to which a value remains in the cell. In alternate implementations, each LSTM cell may have a subset of these components. A neural network system may include LSTM cells in addition to traditional connected nodes (e.g., artificial neurons).

In some implementations, video processing component 506 includes a recurrent neural network system trained to identify emotions based on facial expressions. For example, the video feature output may include a set of emotional labels each with a confidence score (e.g., happy 0.78, aggressive 0.32, sad 0.08). In other words, video processing component 506 may include a neural network trained on labeled images of faces. Video processing component 506 may identify facial expressions, such as smiling, crying, laughing, and grimacing, and further determine the associated emotion. The confidence score indicates a relative confidence in the accuracy of the emotional label determined.

Additionally or alternatively, video processing component 506 may include a recurrent neural network system trained to track the gaze of the depicted user. Eye movements of the user may be tracked, including the direction, speed, and frequency of eye movements. For example, video processing component 506 may track when a user is focused on a source (e.g., the camera, a general frontal direction), and instances of the user diverting their gaze. Video processing component 506 may further determine the frequency/speed associated with the user's eye movements. Thus, the video feature output may further include gaze tracking features and/or emotional labels based on the gaze tracking features.

Acoustic processing component 508 is configured to analyze acoustic features (e.g., tone, pauses, relative volume). Acoustic processing component 508 includes a neural network system, such as a convolutional neural network. In one implementation, acoustic processing component 508 is configured to identify the number of pauses a speaker takes, identify instances of one speaker interrupting another, and/or determine the relative tone/volume of a speaker. For example, acoustic processing component 508 may determine that a user is speaking at an elevated or reduced volume. As another example, acoustic process component 508 may determine the user is speaking at an accelerated rate, or with a modified pitch.

Acoustic processing component 508 may output statistics based on the acoustic data (e.g., number of pauses, duration of speaking, relative voice volume), and/or emotional labels based on the acoustic data.

Textual processing component 510 analyzes the text data of utterance 502 (e.g., the transcription). In the example implementation, textual processing component 510 includes a convolutional neural network. In some implementations, textual processing component 510 is configured to identify conversation topics based on the text data. For example, textual processing component 510 may determine the number of topics discussed in the utterance. Textual processing component 510 may further analyze the sentiment of the utterance. For example, textual processing component 510 may determine an utterance includes a user is agreeing, disagreeing, responding with a new thought, or merely acknowledging. Textual component may identify text, such as "what about . . ." or "how does . . ." as more active compared to statements, such as "go ahead . . ." or "I see . . . ." Textual processing component 510 generates an output including a computational representation of identified features from the text data.

As described above, machine learning system 504 is configured to combine (e.g., concatenate, add, multiply, embed, etc.) the output (e.g., the computational representation of identified features) of video processing component 506, acoustic processing component 508, and textual processing component 510. Machine learning system 504 combines the results of the sub-components to generate utterance output 512. Machine learning system 504 may alternatively generate tensors, vectors, unstructured data, and the like.

Utterance output 512 is the aggregate of the computational (e.g., mathematical, statistical) representation of features identified in the various data modalities (e.g., acoustic, video). In the example implementation, individual neural network based components (e.g., recurrent neural networks, convolutional neural networks) are used to generate feature data for each of the data modalities. Utterance output 512 is used as input to an additional machine learning system configured to generate conversation analysis indicators, as described in FIG. 6.

Figure 6:
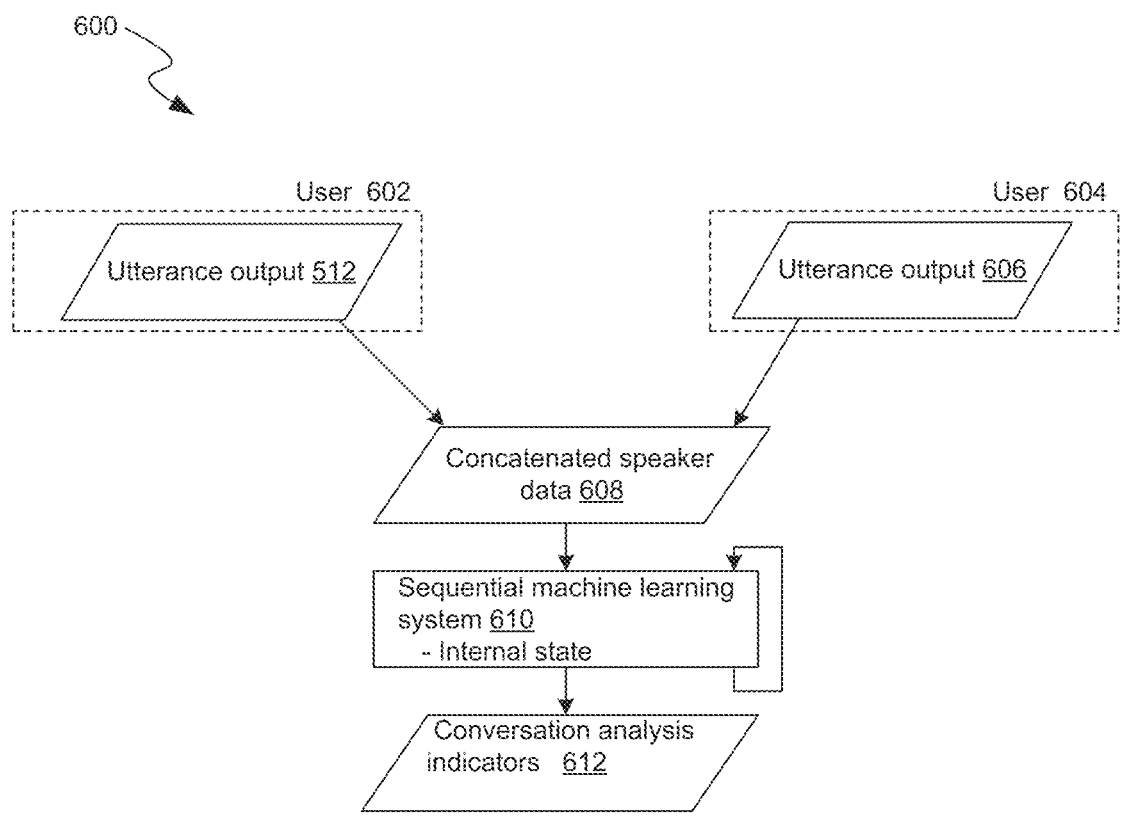
FIG. 6 illustrates a sequential machine learning system for generating conversational analysis indicators based on a sequence of utterances.

FIG. 6 illustrates a sequential machine learning system generating conversational analysis indicators based on a sequence of utterances.

Conversation analytics system 600 includes sequential machine learning system 610, and the associated input utterances (e.g., utterance output 512, described at FIG. 2). Sequential machine learning system 610 is configured to sequentially process utterances. In other words, a sequence of utterances are transformed into a sequence of conversation analysis indicators 612. The conversation analysis indicators include, for example, an emotional/behavioral state of the conversation as of the most recently processed utterance. Utterances may be processed in response to live or pre-recorded conversations.

In some implementations, conversation analysis indicators 612 further include synthesized conversation features. Synthesized conversation features leverage features from multiple data modalities (from utterance output 512) to generate higher-level features. These higher-level features may not be directly observable in individual utterances. For example, synthesized conversation features can include an engagement score, and/or an active listening score. Synthesized conversation features are further described at FIG. 15.

Utterance output 512, as described at FIG. 5, is associated with user 602. In the example implementation, the overall conversation includes both user 602 and user 604. However, the conversation may include any number of users, mentees, coaches, speakers, etc. Sequential machine learning system 610 is configured to concatenate utterance outputs for each speaker into concatenated speaker data 608. In the illustrated implementation, utterance output 512 and utterance output 606 (associated with user 604) are concatenated.

Sequential machine learning system 610 is configured to generate conversation analysis indicators 612 based on concatenated speaker data 608. Sequential machine learning system 610 includes, at least, a recurrent neural network. For example, sequential machine learning system 610 may include a neural network composed of long short-term memory (LSTM) cells. In other words, sequential machine learning system 610 maintains an internal state representing previous events (e.g., artifacts of previously processed utterances).

Sequential machine learning system 610 outputs conversation analysis indicators 612. In one implementation, sequential machine learning system 610 is trained to generate a particular conversation analysis indicator, and the conversation analytics system may include multiple instances of sequential machine learning system 610. For example, each instance of sequential machine learning system 610 may be trained to generate a different conversation analysis indicator.

In one implementation, conversation analysis indicators 612 include any combination of emotional labels, emotional intensity scores, and confidence scores. One instance of conversation analysis indicators 612 may include: happy 0.8, excited 0.7, aggressive 0.5, sad 0.1.

In some implementations, conversation analysis indicators 612 further include binary sentiment identifiers, emotional labels, intensity scores, and/or genuineness scores. Binary sentiment identifiers may include positive/negative. Intensity scores may define the intensity of expression for a particular emotional label. For example, a first user speaking sternly and a second user yelling may both be confidently identified with the emotional label of anger, and the second user may have a higher intensity score. Genuineness scores may define the veracity of emotional labels. For example, some users may intentionally appear excited (e.g., excessive smiling, abrupt change in tone) indicating a reduced genuineness score.

In some implementations, conversation analysis indicators 612 include user confidence scores, and/or conversation quality scores. For example, a conversation including multiple interactions between two speakers may indicate a conversation quality score. As another example, a conversation dominated by one speaker may have a reduced conversation quality score. A user confidence score may be defined by, in one implementation, the number of interruptions the user makes and/or the level of jitter in the user's voice.

In some implementations, conversation analysis indicators 612 include engagement scores, enthusiasm scores, ownership score, goal score, interruptions score, and "time spent listening" score, and/or attention scores. For example, engagement scores may be influenced by the number of questions asked and the length of statements made. Enthusiasm scores may be influenced by changes in pitch, changes in voice volume, and excited facial expressions. Attention scores may be defined by gaze detection (e.g., on-screen gaze, eye contact gaze) and body pose detection from the video data.

In some implementations, conversation analysis indicators 612 include goal discussion scores. Goal discussion scores may be defined by the prevalence and/or distribution of keywords in the conversation (e.g., text data). For example, the prevalence of keywords, such as "growth," "communication," "proactive," etc., may define the goal discussion scores.

Conversation analysis indicators 612 may be divided into four categories. These categories include: atomic short time, composite short time, atomic long time, and composite long time. Atomic indicators represent individual events, not dependent on the surrounding conversation. Composite indicators are dependent on sequences of events occurring in the conversation, across multiple utterances. Short time indicators occur within a relatively short time (e.g., 0.5 to 3 seconds), while long time indicators include events occurring over a relatively longer timeframe (e.g., seconds, minutes). Atomic short time indicators include nodding, smiling, and listener feedback. Composite short time indicators include active listening. Atomic long time indicators include floor time, overlaps, gaps/delays. Composite long time indicators include turn-taking.

In some implementations, conversation analysis indicators 612 include complex indicators, such as emotional suppression (e.g., neutral affect combined with low genuineness), uncertainty reduction (e.g., reassuring language and visual cues), and nonconscious mimicry (e.g., adopting the speaking style of a second speaker).

Figure 7:
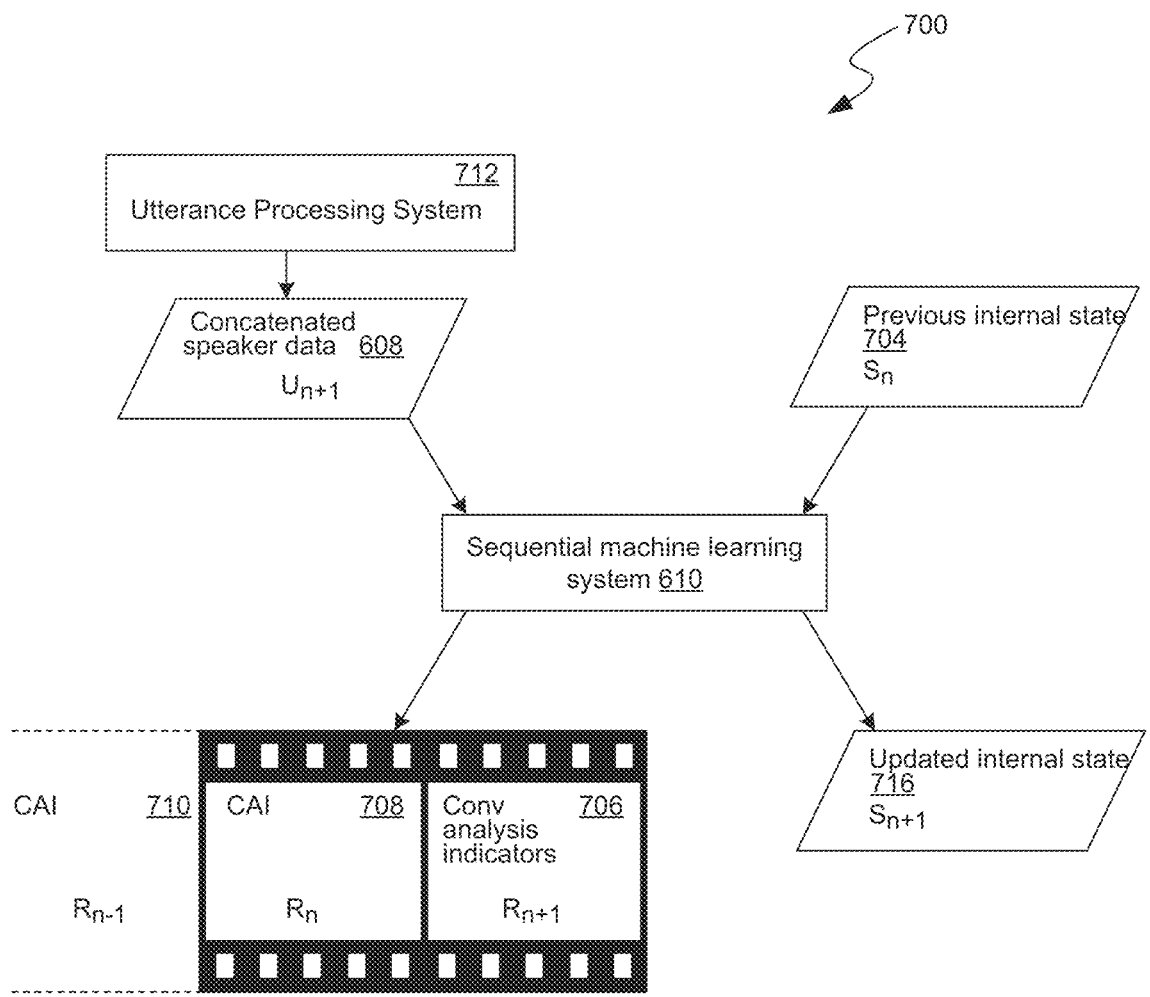
FIG. 7 illustrates generating conversation analysis indicators at multiple points in a conversation.

FIG. 7 illustrates generating conversation analysis indicators at multiple points in a conversation. Conversation analytics system 700 includes some components from conversation analytics system 600, as indicated by the reference numerals. Sequential machine learning system 610 receives utterance data, such as concatenated speaker data 608 (shown in FIG. 3) and utterance output 512 (shown in FIG. 2). Each instance of utterance data is defined by a particular verbal statement and associated with a user in the conversation. Sequential machine learning system 610 is configured to track the state of the conversation over time by implementing a recurrent neural network. Sequential machine learning system 610 is configured to generate multiple instances of conversation indicators, such that the status of the conversation may be tracked over time. In the example implementation, sequential machine learning system 610 generates a sequence of conversation analysis indicators corresponding to the sequence of utterance data input.

In the example implementation, sequential machine learning system 610 includes a recurrent neural network. The recurrent neural network used to generate the conversation analysis indicators is dependent on both the current input (e.g., the current utterance data) and the previous state of the neural network system (e.g., previous nodes, previous output). Thus, the conversation analysis indicators generated in response to an utterance are reflective of both the utterance and the surrounding context of the conversation.

Overall, sequential machine learning system 610 generates conversation analysis indicators 612 based on concatenated speaker data 608 and previous internal state 704. During the processing of concatenated speaker data 608, the internal state of sequential machine learning system 610 is updated, for use in processing an upcoming instance of speaker data (e.g., the next utterance).

Conversation analysis indicators 708 and 710 correspond to previous utterances and thus previous internal state of sequential machine learning system 610. Conversation analysis indicators (e.g., 706, 708, 710) may be stored with timestamps, for correlation with the source utterance and acoustic/video data of the conversation. In other words, conversation analysis indicators may be stored in a series, based on a series (i.e., sequence) of utterances and/or concatenated speaker data. The stored conversation analysis indicators may be graphed, visualized, and analyzed in aggregate by conversation analytics system 400.

Figure 8:
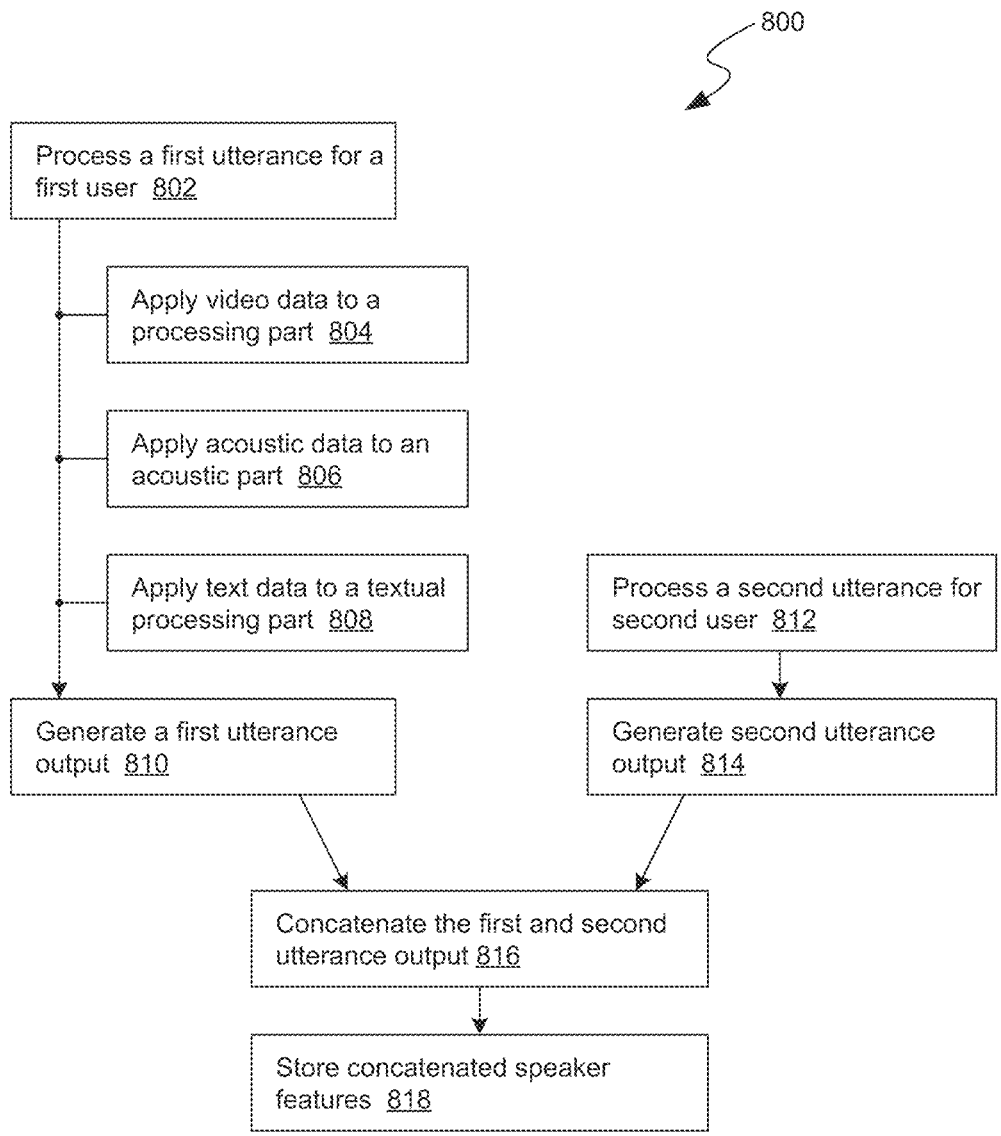
FIG. 8 illustrates a process for generating utterance outputs for multiple speakers and combining them.

FIG. 8 illustrates a process for generating utterance outputs for multiple speakers and combining them. A first utterance output, representing computationally identified emotional features of an utterance, is generated by applying a machine learning system to the utterance of a first user. At block 802, process 800 retrieves a first utterance associated with the first user. The first utterance may be a segment of a stored verbal conversation, defined by a particular statement from the first user. In other implementations, the conversation may be segmented by sentence, words, predefined time frames, and so on.

The first utterance includes at least, acoustic and video data. For example, the first utterance may be recorded by a webcam (e.g., camera and microphone accessory for computer), during a web-based video conference. In some implementations, block 802 further includes generating text data for the utterance based on transcribing at least a part of the conversation. In other implementations, process 800 may include accessing a transcription service, or a previously stored transcription.

At block 802, process 800 retrieves a first utterance that is associated with the first user, a segment of a conversation between at least two users, and further includes at least video data, acoustic data, and text data.

At block 804, process 800 applies video data of the first utterance to a first video processing part of the machine learning system to generate video-based output. In one implementation, the video processing part is a neural network configured to identify facial expressions based on frames from the video data. For example, the video data may be labeled with facial expressions (e.g., smiling, grimacing, crying, nodding) and/or emotional labels (happy, sad, aggressive, surprised, disappointed). These labels may further each have confidence scores, indicating the relative confidence of the video processing part in that particular label (e.g., decimal score between zero and one).

Additionally or alternatively, the video processing part may be configured to identify poses, hand gestures, and/or body language in the video data. For example, the frequency with which a user performs hand gestures may be determined. The relative arm position of the user may also be determined. In one example, arms crossed over the chest may be labeled with tension, and arms limp at the sides may be labeled with disinterest.

At block 806, process 800 applies acoustic data of the first utterance to an acoustic processing part of the machine learning system to generate acoustic-based output. The acoustic data includes waveform data defining the tone, pitch, and timing of the conversation. In the example implementation, the acoustic processing part is configured to determine prosodic features and/or phonation features. For example, one or more of the speaker's tone, pitch, timing, voice quality, and so on, may be determined. Additionally, the time spent talking and the time spent silent may be determined. In some implementations, Mel Frequency Cepstral coefficients may be determined. The acoustic-based output may include any combination of the acoustic statistics described above and emotional labels. For example, the acoustic-based output may include the time the speaker spent talking, the relative pitch of the speaker's voice, an emotional label of excited, and a confidence score.

At block 808, process 800 applies textual data of the first utterance to a textual processing part of the machine learning system to generate text-based output. The textual data includes a transcription of the utterance. The textual processing part is further described in FIG. 2.

At block 812, process 800 includes processing a second utterance for a second user. The second utterance is processed at block 812 similar to the processing that occurs at block 802 including blocks 805, 806, and 808. Process 800 may include processing video data, acoustic data, and text data from the second utterance as the first utterance is processed at block 802. Notably, process 800 may include analyzing the video data, acoustic data, and text data of any number of utterances for any number of users. Process 800, at block 814, generates a second utterance output based on the processing from block 812.

Process 800 concatenates the first and second utterance outputs at block 816. In alternate implementations, any number of utterance outputs may be concatenated. In the example implementation, the first and second utterance outputs are sequentially combined (e.g., concatenated) and/or otherwise joined. In alternate implementations, the first and second utterance outputs may be otherwise mathematically combined. Process 800 stores this result as concatenated speaker features at block 818. The concatenated speaker features stored at block 818 can be used as input to a sequential machine learning system, the sequential machine learning system configured to sequentially process utterances to determine conversation analysis indicators. The sequential machine learning system is further described in, at least, FIG. 9.

Figure 9:
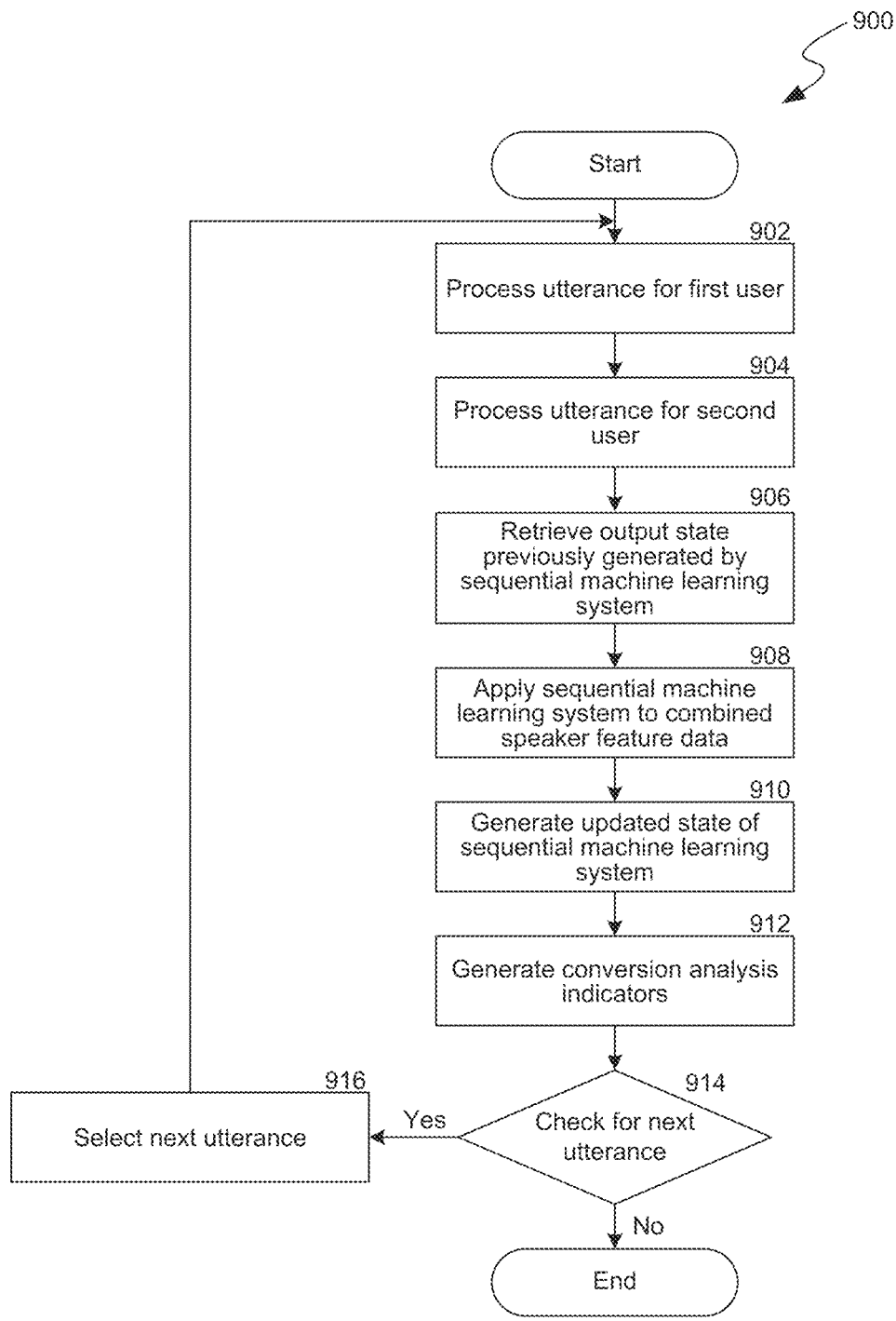
FIG. 9 illustrates a process for generating conversation analysis indicators based on utterance outputs.

FIG. 9 illustrates process 900 for generating conversation analysis indicators based on utterance outputs. At block 902, process 900 includes processing a first utterance for first user, to generate a first utterance output, as described in FIG. 8. At block 902, process 900 includes processing a second utterance for second user, to generate a second utterance output as described in FIG. 8. The second utterance output may be concatenated with the first utterance output by process 900.

At block 906, process 900 retrieves an output state previously generated by a sequential machine learning system. The sequential machine learning system is configured to sequentially process utterances to determine conversation analysis indicators. In addition, the sequential machine learning system maintains/updates an internal state. The internal state computationally tracks events that occur within the conversation (e.g., the sequence of utterances) by integrating memory functionality into the neural network. The internal state is used as an input when processing each utterance. The interaction between the internal state and the input utterance data is determined during a training process of the sequential machine learning system.

At block 908, process 900 includes applying the sequential machine learning system to combine speaker feature data (e.g., the concatenated first and second utterance outputs). Block 908 is dependent on inputs of both the previous internal state of the sequential machine learning system and the combined speaker feature data, as shown in FIG. 3.

At block 910, process 900 generates an updated state of the sequential machine learning system. The updated state is generated by the sequential machine learning system in response to the input of the combined speaker feature data at block 908. For example, the computational detection of a feature may not instantly trigger a change in the conversation analysis indicators, but it may trigger a change in the internal state, impacting how further combined speaker feature data will be processed. For example, a conversation pause may not directly cause a change in conversation analysis indicators; however, a pause followed by a question may indicate the emotional label of confusion. This updated state is stored for feature utterance processing cycles of process 900.

At block 912, process 900 generates conversation analysis indicators. In the example implementation, the conversation analysis indicators include emotional labels, emotional scores, and confidence scores. Conversation analysis indicators are further described in FIG. 6.

At block 914, process 900 determines if a next utterance (e.g., newly captured utterance, next utterance in a recorded sequence) is available. If yes, process 900 continues to block 916, where process 900 selects the next utterance, and begins processing this utterance by jumping to block 902. If no, process 900 ends.

Figure 10:
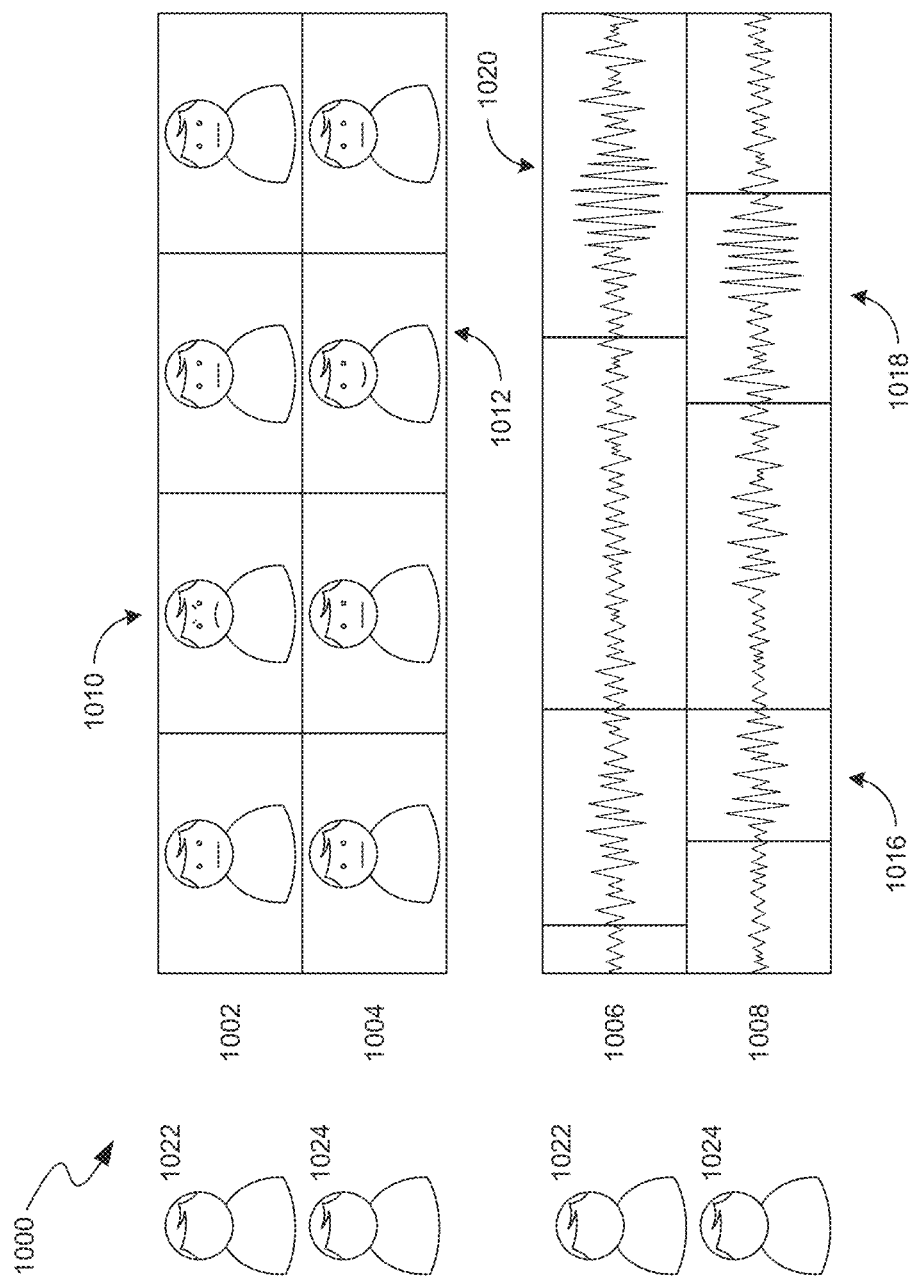
FIG. 10 illustrates the audio and video components of a multiparty conversation.

FIG. 10 illustrates the audio and video components of a multiparty conversation. In the example implementation, multiparty conversation 1000 is a recording of a web-based video conference between two users. More specifically, multiparty conversation 1000 includes two video streams, video stream 1002 for user 1022 and video stream 1004 for user 1024. Multiparty conversation 1000 also includes two audio streams, audio stream 1006 for user 1022, and audio stream 1008 for user 1024.

The utterances in FIG. 10 can be segmented and analyzed, e.g., using the conversation analytics system 400. Utterances include a segment of the multiparty conversation, including video and/or audio data. Utterances may be stored as individual video/audio data files, or as timecode data defining a segment of multiparty conversation 1000.

Conversation analytics system 400 can automatically identify utterances based on features in the audio data and/or video data. Utterances can be identified by changes in the audio data. For example, a user may begin speaking, a user may interrupt another speaker, and so on. Additionally or alternatively, utterances can be identified based on facial expressions, hand gestures, and so on.

In some implementations, conversation analytics system 400 identifies utterances by simultaneously analyzing corresponding audio and video data. For example, an utterance may be identified based on a change in the audio data and a facial expression. This simultaneous analysis of audio and video data may be particularly suited for complex conversations with multiple users speaking. In a conversation with multiple users speaking at the same time in the audio data, the corresponding video data may be analyzed for features (e.g., facial expressions, hand gestures) to accurately identify utterances.

In some implementations, conversation analytics system 400 implements an utterance machine learning system to automatically identify utterances. In one implementation, the utterance machine learning system receives raw audio/video data, and automatically identifies utterances. In another implementation, the utterance machine learning system receives pre-processed data including identified features (e.g., facial expressions, textual transcriptions of the audio, hand gestures) and then determines utterances based on these features.

In other implementations, conversation analytics system 400 receives manually identified utterances. For example, conversation analytics system 400 may receive a set of timestamps defining utterances in the conversation. In yet other implementations, conversation analytics system 400 may transmit identified utterances to annotator 405, and further receive utterances modified by a user (e.g., start/stop times of the utterance modified) in response.

Utterance 1016 is identified by conversation analytics system 400 based on audio stream 1008. For example, a phrase or sentence spoken by a user may be identified. As another example, any vocalization (e.g., "um," "uh-huh") may be identified. Utterance 1016 is associated with user 1024, based on the identified audio vocalization. Utterance 1016 includes, at least, the relevant segment of audio stream 1008. Utterance 1016 can further include the corresponding video data. Utterance 1016 may include a portion of video stream 1004 which is also associated with user 1024.

In some implementations, utterance 1016 further includes the audio/video data associated with the other user, user 1022. For example, utterance 1016 may include a portion of video stream 1002. In the illustrated implementation, video stream 1002 includes frowning feature 1010, associated with user 1022. Utterance 1016, vocalized by user 1024, may include the corresponding video data of the reaction from user 1022. In some implementations, annotator 405 can include algorithms to identify reactions (e.g., based on facial expressions, audio tone and volume, body language, etc.) occurring in video streams 1002 and 1004, and to further store those reactions with the corresponding utterance.

In some implementations, the segmenting at block 404 can be updated based on conversation features identified by annotator 405. For example, conversation analytics system 400 can automatically identify utterances based on facial expressions, such as a smile feature 1012 in video stream 1004. In response to this identification, conversation analytics system 400 may store the corresponding portions of audio stream 1008 and video stream 1004 as an utterance. In other words, conversation analytics system 400 may be configured to automatically define an utterance as a number of seconds before a user is identified as smiling.

In some implementations, portions of multiparty conversation 1000 may be associated with multiple utterances. For example, conversation analytics system 400 may identify utterance 1020 and 1018 occurring during an overlapping time of multiparty conversation 1000. Utterances 1020 and 1018 may be each associated with user 1022 and 1024, respectively. Alternatively, utterances 1020 and 1018 may be combined and associated with both user 1022 and 1024.

Figure 11:
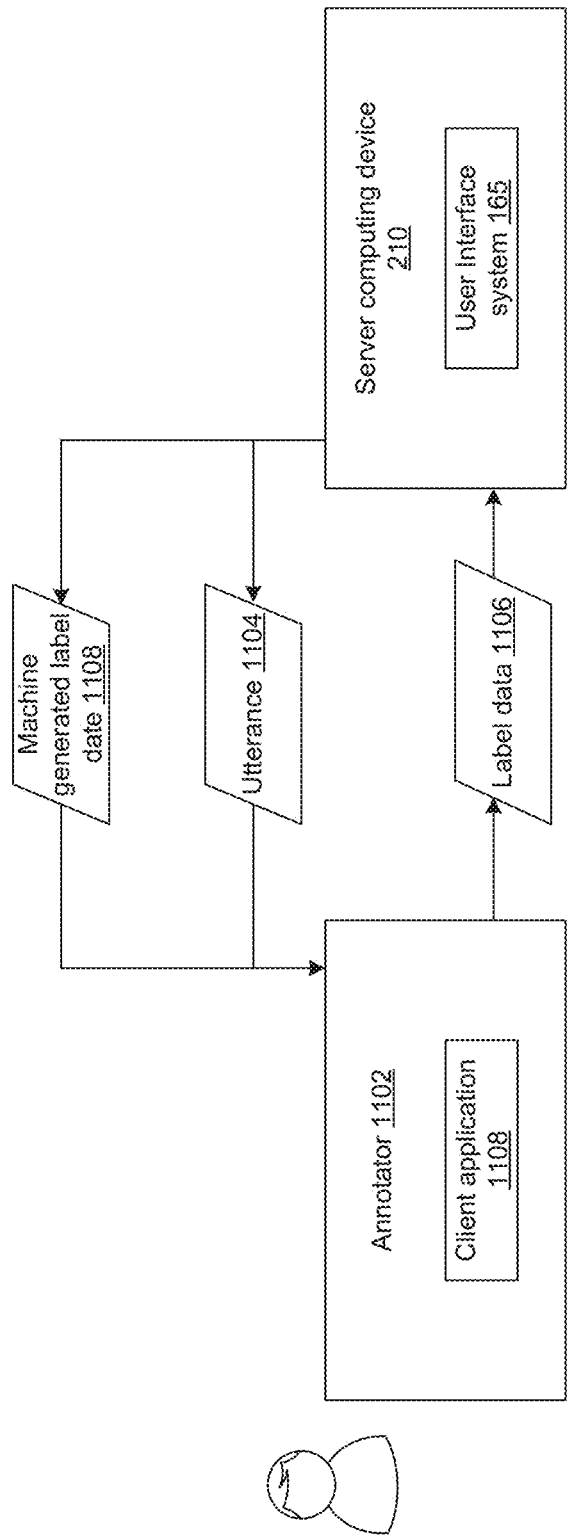
FIG. 11 illustrates a conversation analytics system for receiving label data and other conversation features.

FIG. 11 illustrates an annotator system for obtaining label data. In some implementations, human annotators are used to determine labels for utterances. More specifically, server computing device 210 may be configured to provide client application 1108 to annotator 1102. Server computing device 210 transmits utterance 1104 to annotator 1102. Application 1108, executing at annotator 1102, displays utterance 1104 to a human annotator. Client application 1108 is further configured to accept user input of label data 1106, and further transmit label data 1106 back to server computing device 210.

Additionally or alternatively, server computing device may transmit machine generated label data 1110 to annotator 1102. In other words, annotator 1102 may be configured to review and modify label data generated by a machine learning system. For example, utterances having incorrect labels may be identified and corrected using client application 1108. Machine generated label data 1110 is further described in relation to labeling machine learning system 1202 in FIG. 12.

Server computing device 210 implements user interface system 165 to provide client application 1108 to annotator 1102. In one implementation, client application 1108 is a web application hosted by user interface system 165. Client application 1108 may also be a conventional software package executing at annotator 1102 and in communication with server computing device 210.

Client application 1108 is configured to display a user interface. For example, client application 1108 may include a webpage having a first interactive portion for viewing utterances (e.g., audio/video data) and a second portion for accepting user input of label data. Client application 1108 may replay an utterance using a display and audio device connected to annotator 1102. In some implementations, client application 1108 is configured to display multiple label options for a user to select from. In other implementations, client application 1108 is configured to prompt a user for unstructured label data. In yet other implementations, client application 1108 may display previously machine-generated label data, for a user to confirm and/or modify.

In some implementations, client application 1108 is a collaborative user environment. In other words, multiple annotators may connect to server computing device 210 to evaluate utterance 1104. In other words, utterance 1104 may be simultaneously analyzed by multiple users, each with annotators (e.g., annotator 1102). In one implementation, multiple annotators come to a consensus to determine label data 1106. For example, client application 1108 can be configured to interactively display labels tentatively selected at other annotators. In another implementation, client application 1108 may be configured to review (e.g., step through, approve) label data previously determined at another annotator. For example, a second annotator may interactively review the label data determined by a first annotator, while in communication with the first annotator. Client application 1108 may further include collaboration components, such as a text chat box, audio conferencing, video conferencing, screen sharing, and the like. For example, client application 1108 may be configured to coordinate the playback of utterance 1104 simultaneously across multiple annotators.

In some implementations, annotator 1102 coordinates manually labeling utterance 1104 with synthesized conversation features. For example, machine generated label data 1108 may include the output of modality-specific feature extraction algorithms (e.g., facial expression recognition, voice pitch), and the manually generated label data 1106 includes a synthesized conversation feature identified by the annotator based on the machine generated label data 1108. Server computing device 210 may subsequently train a conversation synthesis ML ("machine learning") system. In further implementations, machine generated label data 1108 may include synthesized conversation features based on first level conversation features. In some implementations, synthesized conversation features may also be based on other synthesized conversation features. As further described in FIG. 16, synthesized conversation features may be described as interdependent, or forming a hierarchy (e.g., 2nd order features, 3rd order features) where higher order synthesized conversation features are generated based on lower order conversation features.

Figure 12:
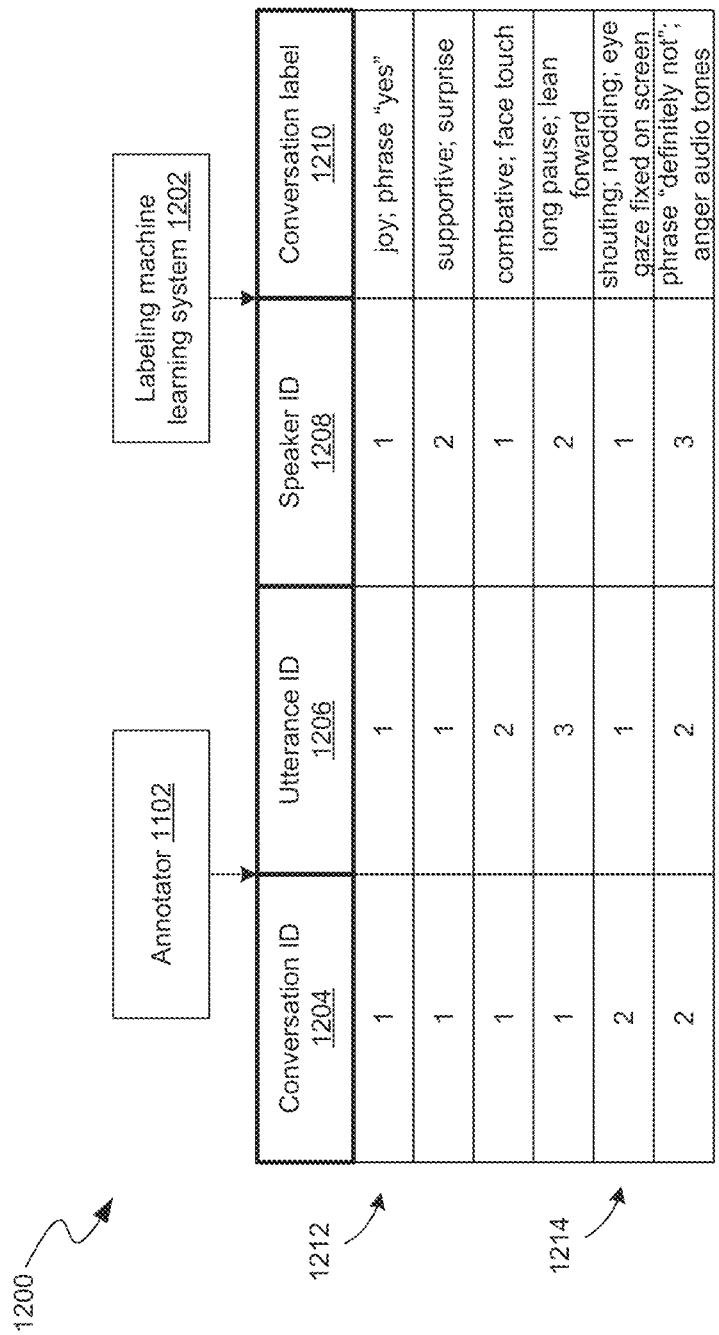
FIG. 12 illustrates a data structure for storing conversation features.

FIG. 12 illustrates a data structure 1200 for storing conversation labels. In the example implementation, label data is stored in a database table. However, the label data may alternatively be stored in a data storage system, such as an unstructured and/or document-oriented database system. The label data can include columns for conversation ID 1204, utterance ID 1206, speaker ID 1208, and conversation labels 1210. In other words, conversation labels 1210 may be associated with any combination of utterances, speakers, and conversations. In some implementations, conversation labels 1210 include conversation effectiveness ratings. Conversation effectiveness ratings may be a subjective score or rating defining the effectiveness of the conversation towards a particular goal or activity. For example, conversation labels 1210 may include coaching effectiveness scores. Label data 1210 may include a high effectiveness score when the associated utterance is a good example of motivational interviewing, open-ended interviewing, coaching, and so on.

Entry 1212 is associated with a conversation #1, an utterance #1, and a speaker #1. Entry 1212 further includes multiple conversation labels: "joy" and phrase: "yes." Conversation labels 1210 may be manually and/or automatically generated, e.g., using annotator 1102, machine learning system 1202, and/or the algorithms for preprocessing from block 404. Machine learning system 1202 may be trained on data generated by annotator 1102. For example, label data may initially be populated with data from annotator 1102. Labeling machine learning system 1202 may then be trained on label data to configure the system for automatic machine labeling of utterances with conversation labels.

Entry 1214 is associated with a different conversation #2 and has an utterance ID of 1 for that conversation. Notably, the speaker ID 1208 is the same between entries 1212 and 1214. Thus, speaker #1 may be tracked through multiple conversations, which may have varying participants.

In one implementation, label data is received from annotator 1102. Annotator 1102, as shown in FIG. 11, can include a user interface for manually labeling utterances with conversation labels 1210. The label data may be received from annotator 1102 and stored. In other implementations, the label data is received from an algorithmic or machine learning labeling system 1202. System 1202 may be configured to automatically generate conversation labels 1210, and further to store the label data. In some implementations, annotator 1102 is configured to access the label data, and retrieve label data generated by labeling machine learning system 1202. In other words, annotator 1102 may retrieve automatically generated conversation labels from the label data. In some implementations, this can allow a user to confirm or revise the automatically generated labels. Annotator 1102 further stores confirmed and/or revised conversation labels 1210. Annotator 1102 may be configured to review, revise, and approve the label data.

Figure 13:
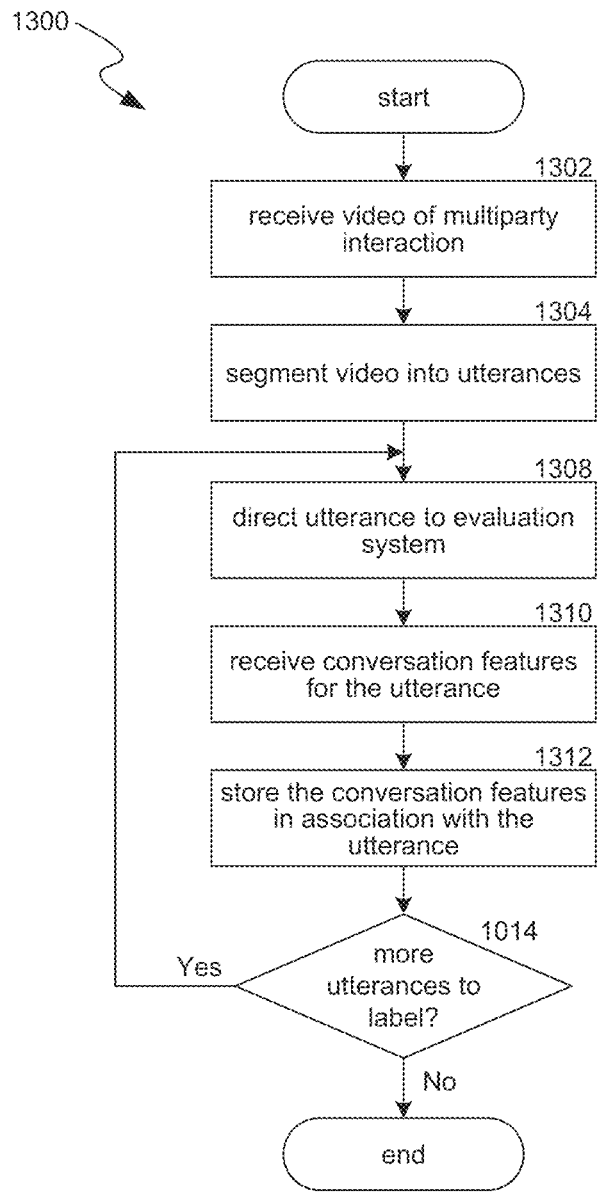
FIG. 13 illustrates a process for generating conversation features for utterances of a conversation.

FIG. 13 illustrates a process 1300 that segments a conversation into utterances and generates utterance conversation features. At block 1302, process 1300 receives a multiparty conversation. The conversation may be received live from an internet-based teleconference including multiple users. Alternatively, the conversation may be a recording of an in-person meeting between multiple users. At block 1304, process 1300 segments the conversation data into utterances, as described in FIG. 10. In some implementations, process 1300 identifies utterances based on vocalizations by users in the audio data and stores the corresponding video and audio data. Process 1300 may further identify the speaker associated with the utterance.

At block 1308, process 1330 directs an utterance to an evaluation system. In one implementation, the evaluation system includes an annotator configured for manual evaluation by a trained human annotator. In another implementation, the evaluation system includes algorithms configured to identify conversation features and/or a machine learning system trained to generate conversation labels. In yet another implementation, the evaluation system includes a combination of the automatic system to generate initial labels and a human labeling system to review, confirm, and/or modify machine-generated conversation labels.

At block 1310, process 1300 receives conversation features for the utterance. The conversation features can be first level conversation features such as encodings of the audio, video, and/or text of the audio, or synthesized conversation features such as emotional label data (e.g., "joyful," "agreeable," "surprised," "angry," "combative," "neutral,") identifications of body language or posture (e.g., eye gaze directions, leaning directions, etc.), identifications of particular phrases used (e.g., "yes," "yah," "uh-huh," "no," "definitely not," etc.), qualities of the audio and inferences from the audio (e.g., shouting, high pitch, speaking rapidly, speaking slowly, pause in speech, etc.), and so on. Process 1300 may receive the conversation features from an algorithm, a machine-learning labeling system, and/or a human annotator. At block 1312, process 1310 stores the conversation features in association with the utterance. In the example implementation, process 1310 stores the received conversation features in a table, tagged with identifiers of the associated utterance, at least one speaker, and a conversation.

At block 1314, process 1300 checks if more utterances require labeling. If more utterances are available, process 1300 returns to block 1308 with a new utterance selected. This new utterance is directed to the evaluation system as described above with respect to block 1308. If no additional utterances are available, process 1300 terminates.

Figure 14:
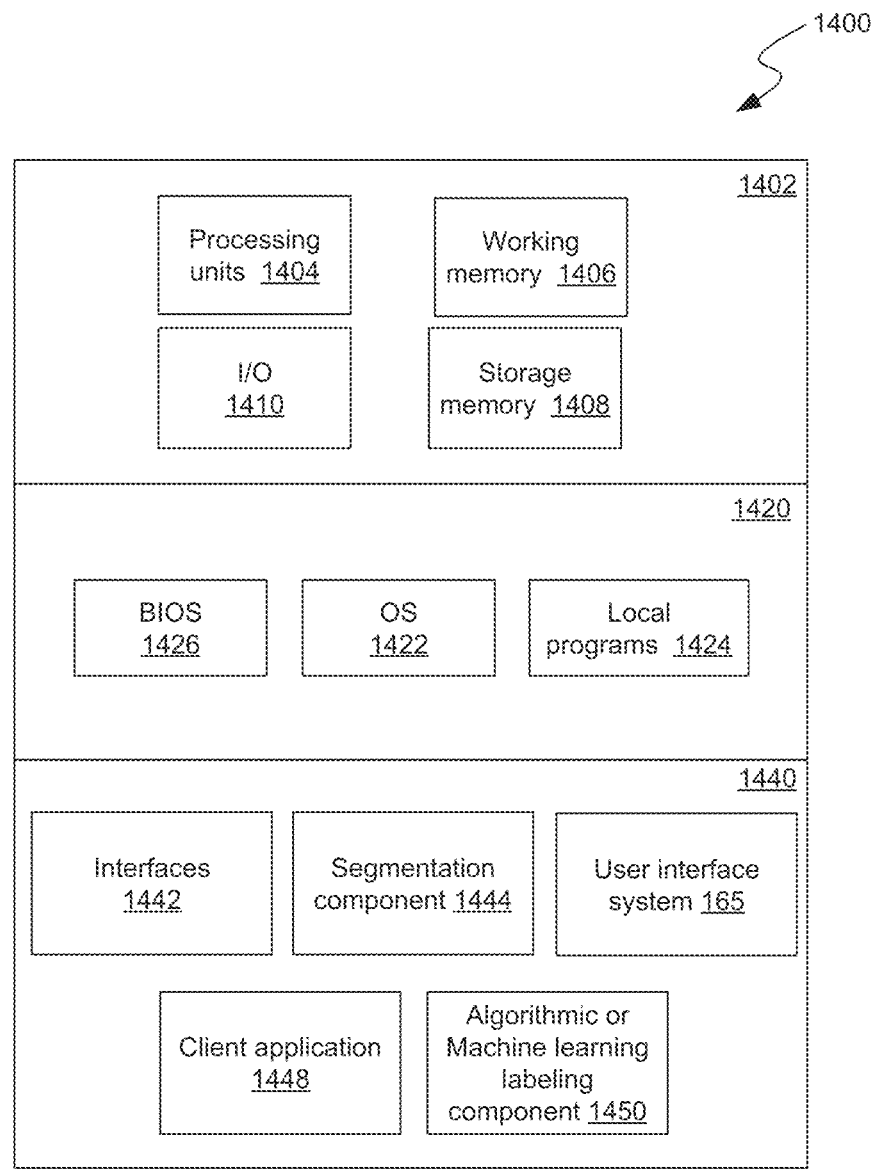
FIG. 14 is a block diagram illustrating components which, in some implementations, can be used in a system employing the disclosed technology.

FIG. 14 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware including processing units 1404 (e.g., CPUs, GPUs, APUs, etc.), working memory 1406, storage memory 1408 (local storage or as an interface to remote storage, such as storage 215 or 225), and input and output devices 1410. In various implementations, storage memory 1408 can be one or more of: local devices, interfaces to remote storage devices, or combinations thereof. For example, storage memory 1408 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 1400 can be implemented in a client computing device, such as client computing device 205 or on a server computing device, such as server computing devices 210 or 220.

General software 1420 can include various applications including an operating system 1422, local programs 1424, and a basic input output system (BIOS) 1426. Specialized components 1440 can be subcomponents of a general software application 1420, such as local programs 224. Specialized components 1440 can include segmentation component 1444, user interface system 165, client application 1448, algorithmic or machine learning labeling component 1450, and components which can be used for providing user interfaces, transferring data, and controlling the specialized components, such as interfaces 1442. In some implementations, components 1400 can be in a computing system that is distributed across multiple computing devices or can be an interface to a server-based application executing one or more of specialized components 1440.

Segmentation component 1444 is configured to automatically segment multiparty conversations into utterances. Segmentation component 1444 is configured to simultaneously analyze multiple audio/video streams from any number of users, and to automatically determine utterances (e.g., segments of the conversation) associated with a user in the conversation.

User interface system 165 is a server-side component corresponding to client application 1448, as shown in FIG. 11. In some implementations, client application 1448 is transmitted to an annotator, and client application 1448 includes a collaborative environment for multiple users to simultaneously label an utterance with conversation features. User interface system 165 is configured to transmit utterances to annotators, and further to receive label data in response.

Algorithmic or machine learning label component 1450 can include machine learning label component 1202 from FIG. 12 and/or algorithms to identify conversation features, such as tone thresholds or other mappings of audio features to inferences, body position (e.g., skeletal, eye tracking, hand tracking, etc.) identification modules and corresponding mappings of body positions to conversation features, etc. In some implementations, algorithmic or machine learning labeling component 1450 is configured to generate label data (e.g., conversation feature labels) in response to utterances (e.g., audio/video data of a multiparty conversation) by applying a machine learning module trained on human labeled data to identify conversation features. For example, the training data may include label data received from annotator 1102, as shown in FIG. 11.

Figure 15:
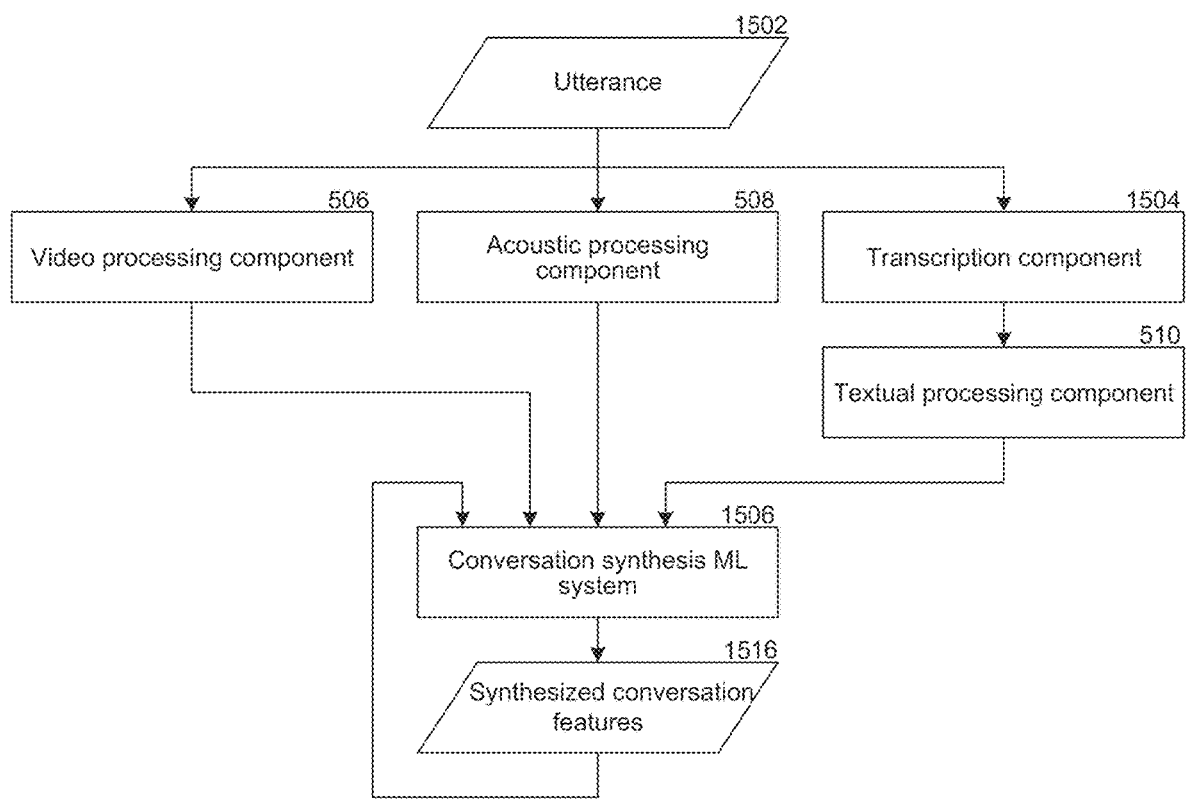
FIG. 15 illustrates a process for generating synthesized conversation features.

FIG. 15 illustrates a process for generating synthesized conversation features. Synthesized conversation features can leverage first level conversation features from one or more data modalities (e.g., audio, video, text, biometric, etc.) and/or other synthesized conversation features into higher-level synthesized conversation features. Such synthesized conversation features may not be directly evident in individual utterances, but can be informative as to the quality of the conversation. Conversation synthesis ML ("machine learning") system 1506 can synthesize data across multiple data modalities. In the illustrated implementation, conversation synthesis ML system 1506 retrieves the output of video processing component 506, acoustic processing component 508, and textual processing component 510. Conversation synthesis ML system 1506 can be a sequential machine learning system, such that the generation of synthesized conversation features 1516 can be partially dependent on previously generated synthesized conversation features.

Transcription component 1504 is configured to generate a transcription of utterance 1502. More specifically, transcription component 1504 is configured to retrieve acoustic data for utterance 1502. In some implementations, transcription component 1504 retrieves video data for utterance 1502. In other words, transcription component 1504 can generate high accuracy transcriptions by analyzing audio and/or video data. Textual processing component 510, as described in FIG. 5, analyzes the transcription generated by transcription component 1504 to determine text-based features, such as key discussion topics, use of keywords, occurrence of interjections, nonlinguistic vocalizations, and so on. The operation of conversation synthesis ML system 1506 is further described in FIG. 16.

Figure 16:
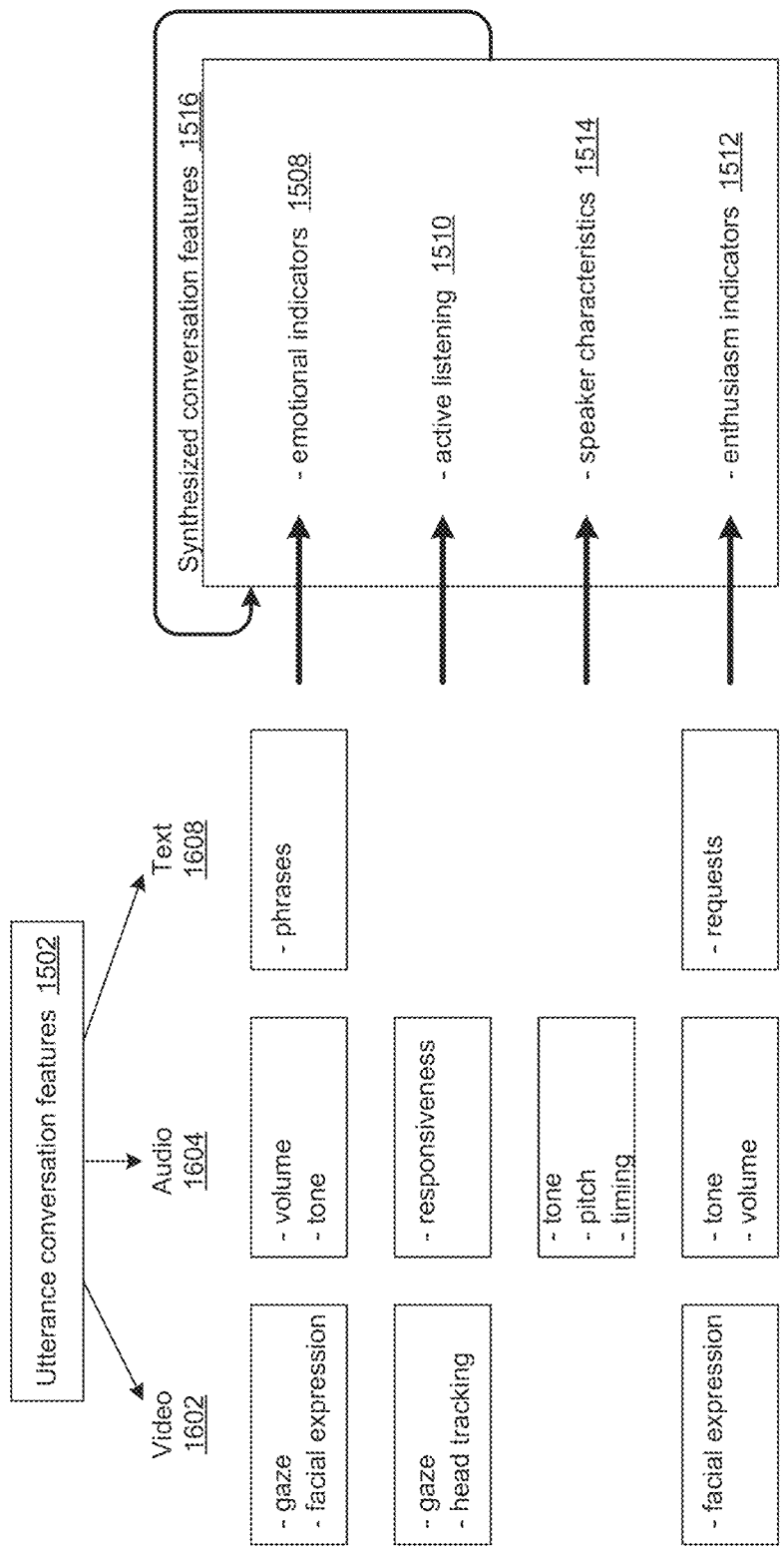
FIG. 16 is a block diagram illustrating four synthesized conversation features to describe the operation of a conversation synthesis ML system.

FIG. 16 is a block diagram illustrating four synthesized conversation features to describe the operation of conversation synthesis ML system 1506. FIG. 16 illustrates an example relationship between some first level conversation features and further synthesized conversation features. Some utterance conversation features can be extracted from an utterance as first level (e.g., directly observable) features present in the utterance. In the example implementation, utterance features include multiple data modalities: video 1602, audio 1604, and text 1608. Conversation synthesis ML system 1506 can use these data modalities to generate synthesized conversation features 1516. In addition, previously stored synthesized conversation features may be used by conversation synthesis ML system 1506 in a sequential machine learning configuration. In other words, utterance features may be combined with synthesized conversation features to generate additional higher-level synthesized conversation features.

FIG. 16 illustrates four synthesized conversation features to describe the operation of conversation synthesis ML system 1506. However, conversation synthesis ML system 1506 may be configured to generate any combination of synthesized conversation features.

Emotional indicators 1508 include high level emotion data consistent with each of the data modalities. Conversation synthesis ML system 1506 can analyze features from the data modalities to generate more emotional indicators 1508. In the illustrated implementation, emotional indicators 1508 are dependent on gaze and facial expression data from video data modality 1602, volume and tone data from audio data modality 1604, and phrases data from text data modality 1608. In other words, a single modality (e.g., text 1608) may provide an incomplete picture of the user's emotional state. For example, when analyzed individually, detection of a question in text data modality 1608 may not indicate the speakers emotional state. However, the combination of the detected question and a detected change in volume/tone and audio data modality 1604 can indicate the speaker is surprised.

In some implementations, synthesized conversation features 1516 can be generated based at least in part on previously generated/stored synthesized conversation features. In other words, higher-level (e.g., second order, third order) synthesized conversation features 1516 can be generated by combining utterance features and previously generated synthesized features. In one implementation, conversation synthesis ML system 1506 is configured to store a history of synthesized conversation features 1516. In another implementation, conversation synthesis ML system 1506 maintains an internal state used when generating a new round of synthesized conversation features 1516.

Active listening features 1510 are, in the example implementation, based on gaze and head tracking data from video data modality 1602, and responsiveness data from audio data modality 1604. For example, active listening feature 1510 may account for both verbal (e.g., acknowledging statements) indicators of active listening, and nonverbal (e.g., nodding, eye contact) indicators of active listening.

Speaker characteristics 1514 are based on audio data 1604 and, in the illustrated implementation, the previous synthesized conversation features. Thus, changes in the tone, pitch, and timing across multiple utterances may be detected by conversation synthesis ML system 1506. Enthusiasm indicators 1512 can be based on facial expressions from video data 1602, tone/volume from audio data 1604, and request statements from text data 1608.

Additional conversation features may be extracted from data modalities (e.g., video, audio, text, etc.). Examples of conversation features from the video data modality 1602 may include smiles, nods, laughter, posture (e.g., slanted, forward, backward, open, closed, expanded, deflated), head position, gestures, etc. Examples of conversation features from the audio data modality 1604 may include listener feedback (e.g., "ah-ha," "um?", "uh-huh," etc.), paralanguage, vocal traffic signals (e.g., "go on," "um . . . ," "but!", etc.), turn length, conversation percentage (e.g., percent of total conversation during which a speaker was active), etc. Examples of conversation features from the text data modality 1610 may include number of topics, topic keywords, repetition of words/phrases, question asking, speaker mimicry, indirect speech, vocabulary convergence, etc. Examples of mixed modality conversation features 1516 can include warmth, intelligence, arousal, engagement, enthusiasm, passion, emotional suppression, conversation repair, question asking, complementing, speech convergence, mimicry, indirect speech, egocentrism, comfort, conflict, dominance, prestige, humor, etc. Conversation features may be automatically generated by a machine learning system (e.g., as shown in FIG. 6), and/or may be manually determined by an annotator (e.g., as shown in FIG. 11).

Figure 17:
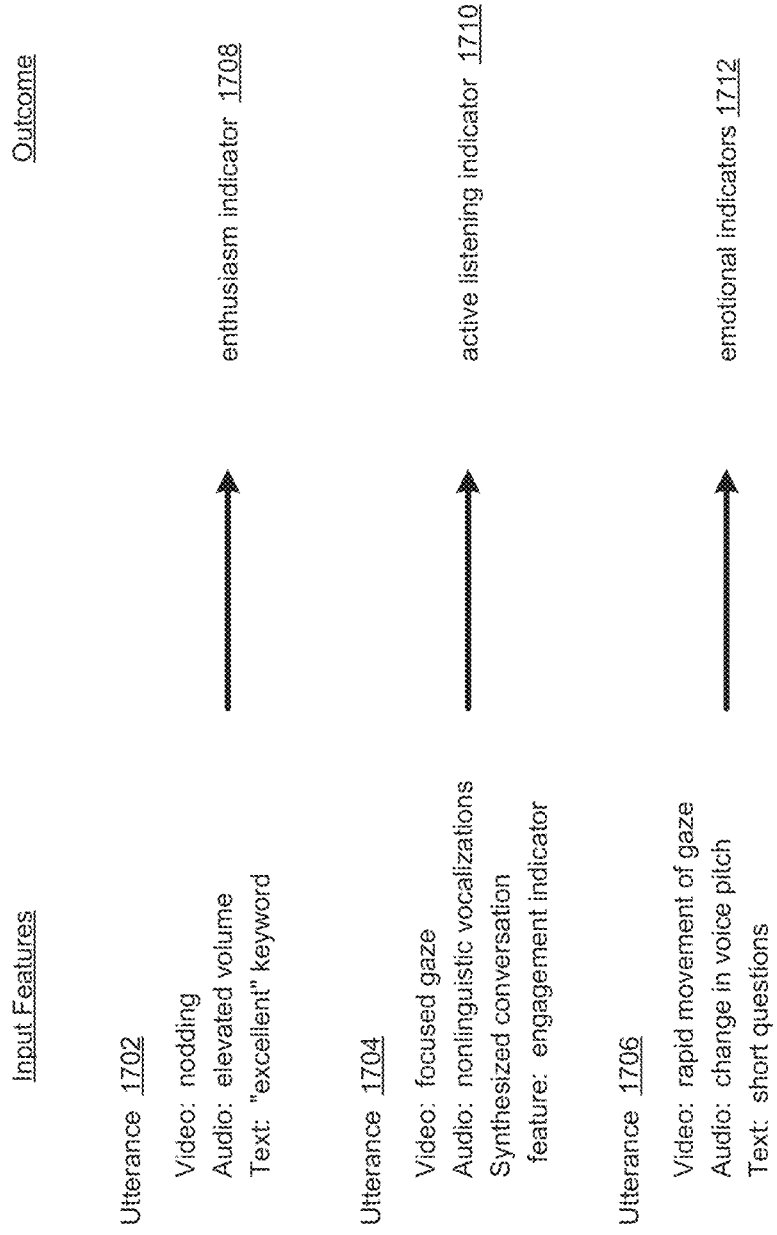
FIG. 17 is a block diagram illustrating generating synthesized conversation features.

FIG. 17 is a block diagram illustrating generating synthesized conversation features. Utterance 1702 includes video of a speaker nodding, audio data indicating elevated speaking volume, and text data including the keyword "excellent." Conversation synthesis ML system 1506 subsequently generates synthesized conversation features for enthusiasm 1708.

In another example, utterance 1704 includes video of a focused gaze, and audio of nonlinguistic vocalizations. Thus, conversation synthesis ML system 1506 generates active listing indicator 1710. In some implementations, conversation synthesis ML system 1506 utilizes previously generated synthesized conversation features as input, for the purpose of generating higher level conversation features (e.g., 3rd order, 4th order). In other words, synthesized conversation features may form a hierarchy. In the illustrated implementation, utterance 1704 includes an engagement indicator that was previously determined by conversation synthesis ML system 1506. The automatic determination of active listening indicator 1710 is based on both features from the individual data modalities, and additional synthesized conversation features. In other implementations, conversation synthesis ML system 1506 maintains an internal state while processing sequential utterances, such that each synthesized conversation feature generated is at least partially based on the previous operation of the ML system.

Utterance 1706 includes video indicating rapid movement of gaze, audio indicating a change in voice pitch, and text including short questions. In response, conversation synthesis ML system 1506 generates emotional indicators 1712.

Figure 18:
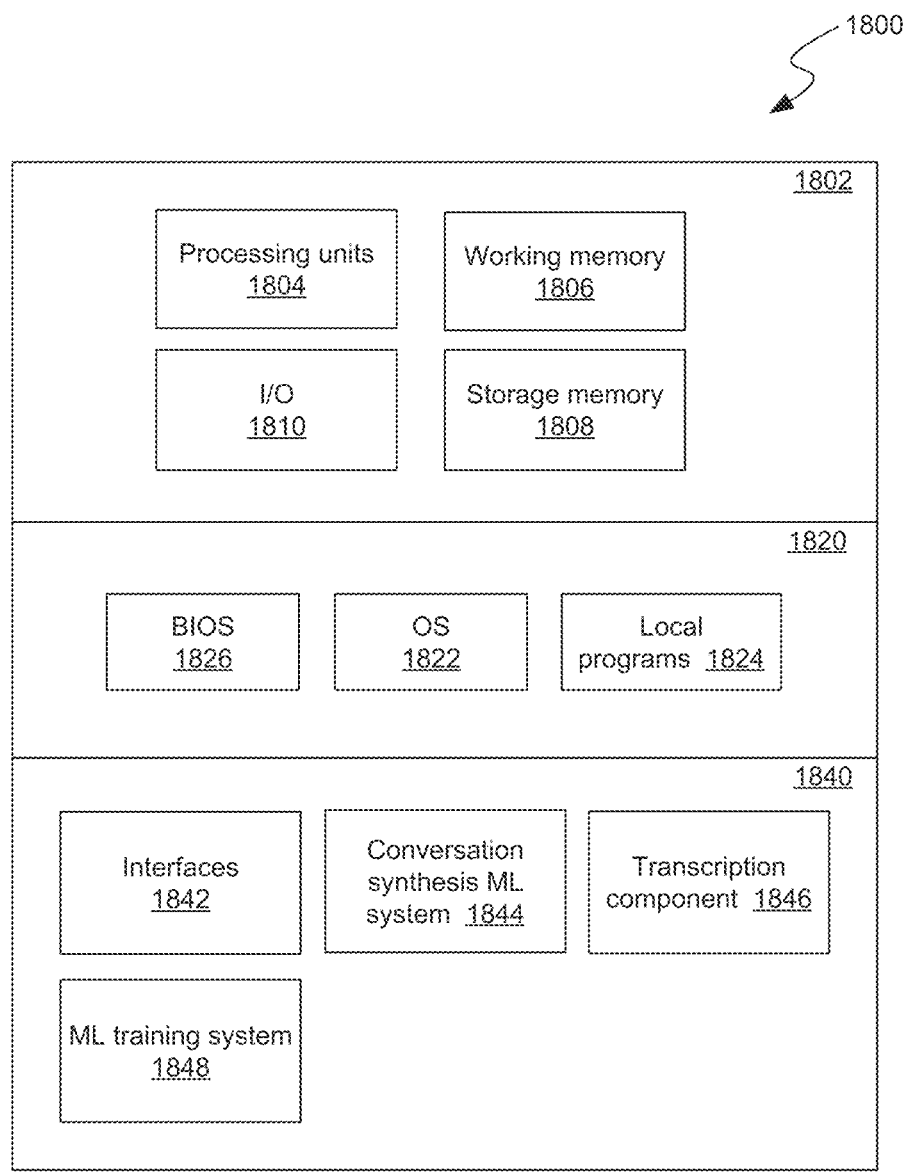
FIG. 18 is a block diagram illustrating components which, in some implementations, can be used in a system employing the disclosed technology.

FIG. 18 is a block diagram illustrating components 1800 which, in some implementations, can be used in a system employing the disclosed technology. The components 1800 include hardware 1802, general software 1820, and specialized components 1840. As discussed above, a system implementing the disclosed technology can use various hardware including processing units 1804 (e.g., CPUs, GPUs, APUs, etc.), working memory 1806, storage memory 1808 (local storage or as an interface to remote storage, such as storage 215 or 225), and input and output devices 1810. In various implementations, storage memory 1808 can be one or more of: local devices, interfaces to remote storage devices, or combinations thereof. For example, storage memory 1808 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 1800 can be implemented in a client computing device, such as client computing device 205 or on a server computing device, such as server computing devices 210 or 220.

General software 1820 can include various applications including an operating system 1822, local programs 1824, and a basic input output system (BIOS) 1826. Specialized components 1840 can be subcomponents of a general software application 1820, such as local programs 224. Specialized components 1840 can include conversation synthesis ML system 1844, transcription component 1846, ML training system 1848, and components which can be used for providing user interfaces, transferring data, and controlling the specialized components, such as interfaces 1442. In some implementations, components 1800 can be in a computing system that is distributed across multiple computing devices or can be an interface to a server-based application executing one or more of specialized components 1840.

Transcription component 1846 automatically transcribes audio from a conversation. Transcription component 1848 may provide a user interface for manual transcription, and/or requesting a transcription from a third-party service (e.g., cloud-based transcription software as a service, document production service). In some implementations, transcription component 1848 includes a combination of automatic transcription (e.g., using a machine learning algorithm) and manual transcription to improve the quality.

Conversation synthesis ML system 1844 holistically can analyze features from one or more data modalities (e.g., audio, video, and text) to generate higher-level synthesized conversation features, which may not be directly observable in individual utterances. For example, conversation synthesis ML system 1844 may generate an active listening score based on the acoustic and video data modalities. As another example, conversation synthesis ML system 1844 may generate an engagement metric based on data modalities including biometrics and video. Additionally, conversation synthesis ML system 1844 can leverage previously generated synthesized conversation features to generate higher level (e.g., 3rd order, 4th order, etc.) conversation features.

ML training system 1848 trains conversation synthesis ML system 1844 to identify synthesized conversation features in response to features from the data modalities. In one implementation, ML training system 1848 is an unsupervised ML system, and trains conversation synthesis ML system 1844 to optimize an objective (e.g., an overall conversation score). In another implementation, ML training system 1848 communicates with an annotator for supervised learning, as shown in FIG. 11. For example, ML training system 1848 may transmit utterance features to an annotator, receive synthesized conversation features identified by the annotator, and subsequently train conversation synthesis ML system 1844 to automatically identify those conversation features.

Figure 19:
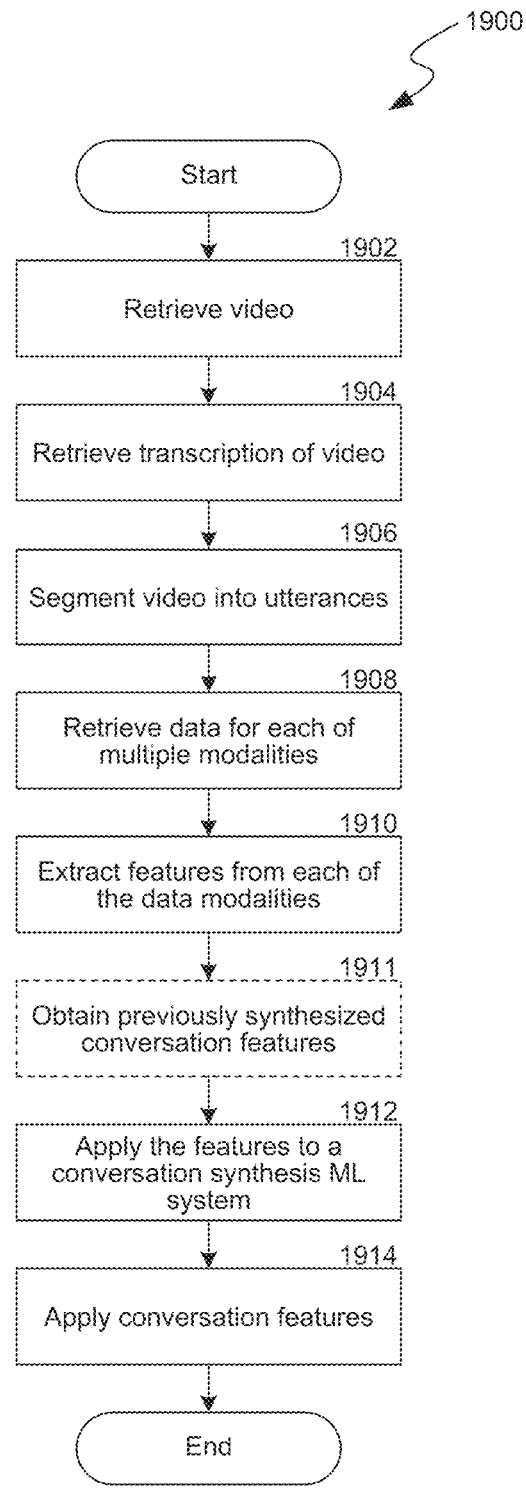
FIG. 19 illustrates a process for generating synthesized conversation features.

FIG. 19 illustrates process 1900 for generating synthesized conversation features. At block 1902, process 1900 retrieves video of a conversation between multiple speakers. Process 1900 further retrieves a transcription of the video at block 1904. Process 1900 may include automatically transcribing the video, providing a user interface for manual transcription, and/or requesting a transcription from a third-party service (e.g., cloud-based transcription software as a service, document production service). In some implementations, process 1900 includes a combination of automatic transcription (e.g., using a machine learning algorithm) and manual transcription to improve the quality.

At block 1906, process 1900 segments the video into utterances. In the example implementation, process 1900 segments the video based on verbal statements made by speakers in the conversation. Additional implementations of utterances are described in relation to FIGS. 10 and 11.

At block 1910, process 1900 retrieves data for each of multiple modalities. In an example implementation, the multiple data modalities include acoustic data, text data, and video data. In other words, each utterance can be associated with three forms of data. Additional data modalities are contemplated, such as biometrics (e.g., heart rate, breathing rate, blushing or other skin changes, eye dilation, moisture/sweat reading, etc.), and computer metrics (e.g., number of times phone is unlocked). Process 1900 may include any combination of data modalities.

At block 1910, process 1900 extracts conversation features from the data modalities using algorithms and/or machine learning applicable to the structure of each data modality. For example, process 1900 can apply gaze tracking and facial expression recognition algorithms to video data; analyze the volume, tone, pitch, and timing of acoustic data; and/or identify linguistic features of the text data. In some implementations, the conversation features can also include embeddings of the audio, video, and/or text itself.

At block 1911, process 1900 optimally leverages previously generated conversation features to generate higher level (e.g., 2nd order, 3rd order, 4th order, etc.) synthesized conversation features. In other words, the conversation synthesis ML system may be a sequential ML system. In one implementation, process 1900 at block 1911 retrieves previous synthesized conversation features. In another implementation, process 1900 at block 1911 retrieves an internal state maintained by the conversation synthesis ML system during the processing of sequential utterances. Block 1911 is shown in broken lines to indicate some implementations that do not include block 1911. This does not indicate that other blocks are necessarily included in all implementations.

At block 1912, process 1900 implements a conversation synthesis ML system. The conversation synthesis ML system can analyze features from one or more data modalities (e.g., audio, video, and text) to generate higher-level synthesized conversation features, which may not be directly observable in individual utterances. For example, process 1900 at block 1912 may generate an active listening score based on the acoustic and video data modalities. As another example, process 1900 at block 1912 may generate an engagement metric based on data modalities including biometrics and video. In some implementations, process 1900 utilizes previously generated synthesized conversation features from block 1911. For example, higher level (e.g., 3rd order) synthesized conversation features may be generated at block 1912 based on a combination of the utterance features and previously generated synthesized conversation features.

At block 1914, process 1900 applies the conversation features generated at blocks 1910 and 1912. In one implementation, process 1900 includes providing a user interface (e.g., web application) for users to review the synthesized conversation features and the corresponding utterances. In another implementation, process 1900 is configured to compare the synthesized conversation features to rules (e.g., feature exceeded a threshold, feature significantly changed) and transmit a notification to a user device. In some implementations, applying the conversation features can include providing the conversation features to a machine learning system to generate one or more conversation analysis indicators, as discussed above in relation to FIGS. 4-9.

Figure 20:
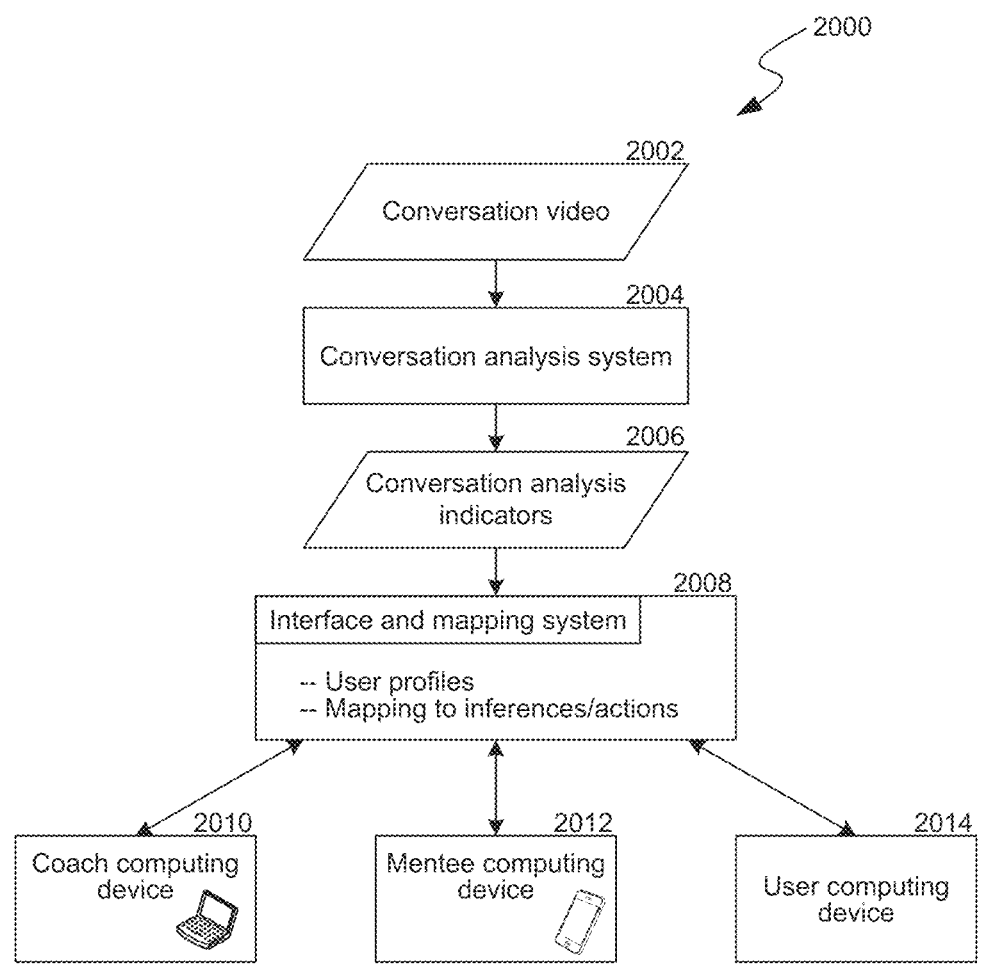
FIG. 20 illustrates a system for providing interfaces and mappings of conversation analysis indicators to inferences or actions.

FIG. 20 illustrates a system 2000 that includes an interface and mapping system 2008 in communication with conversation analysis system 2004 and multiple client computing devices 2010-2014. Interface and mapping system 2008 can include multiple user interfaces for users (e.g., coaches, mentees) to review their performance in both a particular conversation, and in the context of a coaching relationship (e.g., across multiple conversations). Interface and mapping system 2008 can map analytical data (e.g., conversation analysis indicators and corresponding scores) generated by a machine learning systems (as shown in FIG. 4) to fill in templates for user interfaces, to determine inferences about the conversation, and to identify actions to be taken.

Interface and mapping system 2008 can use conversation analytics 2006 generated by conversation analysis system 2004. In general, conversation analysis system 2004 receives conversation video 2002. In the example embodiment, conversation video 2002 includes a coaching conversation between two or more users (e.g., a coach and a mentee). Conversation video 2002 may be a recording of a teleconference between coach computing device 2010 and mentee computing device 2012. Conversation analysis system 2004 analyzes conversation video 2002 as illustrated for example in FIGS. 4 and 6. In response, conversation analysis system 2004 generates conversation analysis indicators 2006, and any number of sub-scores (e.g., engagement sub-score, openness sub-score, etc.)

Conversation analysis indicators 2006 may also be referred to as conversation scores. In some implementations, conversation analysis indicators 2006 include one or more of an openness score, an ownership score, an engagement score, a goal score, an interruptions score, a "time spent listening" score, emotion labels etc. More specifically, conversation analysis indicators 2006 may include the output of multiple versions of sequential machine learning systems (e.g., sequential machine learning system 610, shown in FIG. 6). For example, a first machine learning system may be trained to determine an ownership score, and a second may be trained to determine an engagement score. Conversation analysis indicators 2006 may include the output scores/indicators from multiple machine learning systems trained on conversation features.

Interface and mapping system 2008 receives conversation analysis indicators 2006 (e.g., the output of analyzing a particular conversation), and takes action based on the analysis of the conversation. In one implementation, interface and mapping system 2008 stores user profiles, and updates user profiles based on conversation analysis indicators 2006. For example, conversation analysis indicators 2006 may be appended to a user profile of each user that participated in the conversation.

In some implementations, interface and mapping system 2008 stores a mapping of conversation analysis indicators to inferences/actions. Interface and mapping system 2008 can use resulting inferences from applying the mapping in user interfaces to the "in response to" conversation analysis indicators 2006 or can take actions resulting from applying the mapping to the "in response to" conversation analysis indicators 2006. For example, interface and mapping system 2008 may store rules that map conversation analysis indicators to alerts/notifications. As a more specific example, interface and mapping system 2008 may transmit an alert to coach computing device 2010 in response to a low value in conversation analysis indicators 2006. In another example, interface and mapping system 2008 may transmit a congratulatory notification to mentee computing device 2012 in response to a high value in conversation analysis indicators 2006. The mapping of conversation analysis indicators to actions is further described herein, e.g., in relation to FIGS. 21-24.

The actions implemented by interface and mapping system 2008 can include notifying a user of a conversation score, notifying a coach of a low conversation analysis indicator, notifying a mentee of an increased progress score, suggesting a change in a coaching/mentee pairing, suggesting coaching approaches, suggesting training materials, and so on. In some implementations, interface and mapping system 2008 determines that a coach/mentee match is low quality (e.g., persistent low conversation scores, minimal change in progress score), and automatically initiates a rematch process. In one implementation, interface and mapping system 2008 queries a user profile database to retrieve conversation analysis indicators (e.g., emotional labels, higher order conversation features) associated with potential coaches, compares the retrieved indicators with indicators associated with the mentee, and suggests at least one potential replacement coach based on the comparison.

The user interfaces implemented by interface and mapping system 2008 can include mobile applications, web applications, chat bots, forms and templates, certificates, printed documents, and so on. In some implementations, interface and mapping system 2008 includes a first user interface for reviewing data (e.g., conversation analysis indicators, conversation scores, conversation analysis indicators) associated with a particular conversation, and a second user interface for reviewing multiple conversations (e.g., a coaching relationship, user progress). For example, an interface can include a conversation impact interface (e.g., with a conversation score visualization, as discussed below in relation to FIG. 22). In some cases the interface can include links to conversation highlights, a conversation score breakdown, and indicators of key events (e.g., interruptions, questions, facial expressions) in the conversation (as discussed below in relation to FIG. 23). As another example, a progress user interface may include a progress score chart, a coach match score, sub-scores (e.g., openness, engagement), and a progress score benchmark visualization, etc.

In some implementations, interface and mapping system 2008 implements a web application. For example, coach computing device 2010 may implement a web browser to connect to the web application hosted by interface and mapping system 2008. Coach computing device 2010 may subsequently review conversation analysis indicators 2006 and conversation video 2002. In other implementations, interface and mapping system 2008 hosts an API (e.g., HTTP-based API) in communication with a mobile application. For example, mentee computing device 2012 may execute the mobile application and communicate with interface and mapping system 2008 using the API to review conversation analysis indicators 2006 and conversation video 2002. User computing device 2014 may be a computer used by an annotator, user computing device 2014 can be configured to download conversation analysis indicators and conversation videos in bulk for analysis/review.

Figure 21:
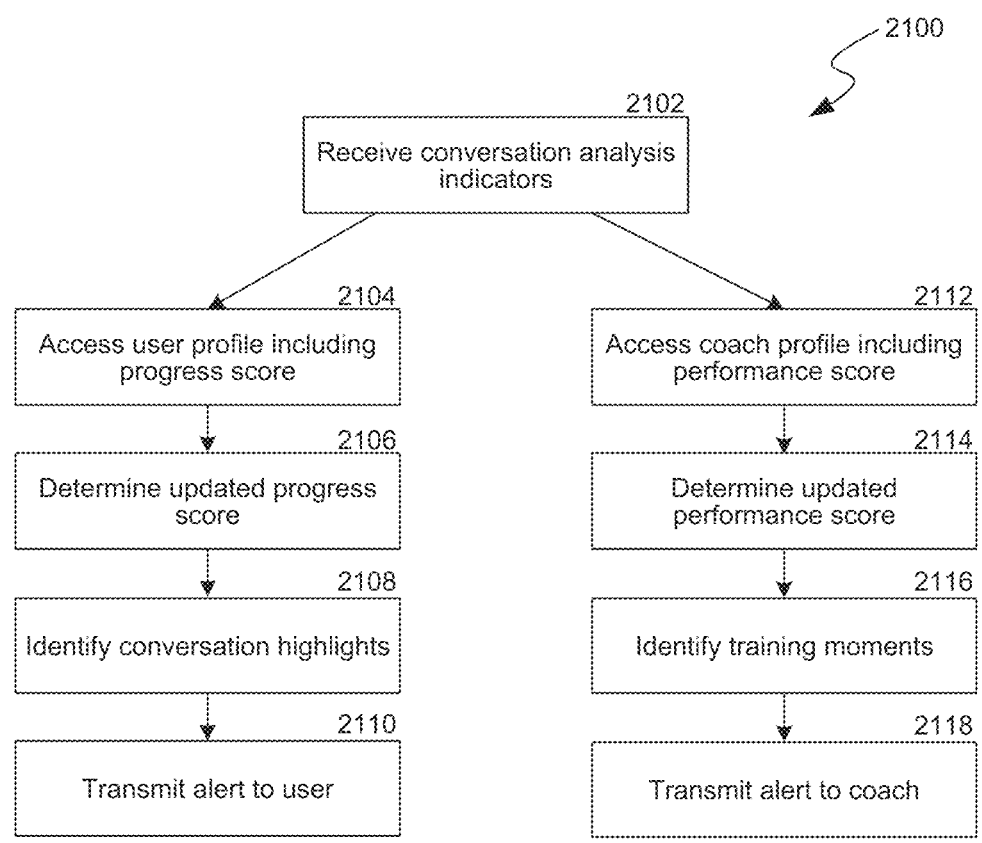
FIG. 21 illustrates a process for updating mentee and coach profiles.

FIG. 21 illustrates a process 2100 for updating mentee and coach profiles. Process 2100 begins with receiving conversation scores and sub-scores (i.e., conversation analysis indicators) for a recorded conversation. Multiple implementations of conversation analysis systems for generating conversation scores and sub-scores are illustrated in, at least, FIGS. 4, 6, 7, 9, 15, and 16.

In response to the conversation analysis indicators, process 2100 updates the user profiles associated with the underlying conversation. In the illustrated implementation, process 2100 updates a mentee profile and a coach profile. More specifically, process 2100 includes determining an updated progress score for a mentee based on the conversation analysis indicators and determining a performance score for a coach based on the conversation analysis indicators. The progress score defines a user's progress in professional development as defined by goals set by the mentee, coach, or a third party. The performance score can signify a coach's effectiveness in increasing the progress score of her mentees.

Process 2100 further includes identifying conversation highlights. In some implementations, conversation highlights are identified based on events detected in the data modalities (e.g., audio, video, text) of the conversation. For example, highlights (e.g., a subsegment of the conversation video) may be generated based on facial expression (e.g., smiles, grimaces), verbal statements (e.g., exclamations, questions, interruptions), and so on. As another example, conversation analysis indicators may be determined continuously throughout a conversation, and the conversation highlights may be determined where there are threshold levels of change (e.g., deltas between sequential conversation analysis indicators being over a threshold, slope of a line connecting multiple conversation analysis indicators being over a threshold, or such a slope changing between positive and negative). More specifically, segments of the conversation that significantly impact the conversation score may be automatically identified as highlights.

Process 2100 also includes transmitting alerts to mentees and/or coaches. For example, a text message may be sent to a user that includes their conversation and progress score. As another example, an email may be sent to a user that includes the conversation and effectiveness score. Additional alerts and mappings of scores to inferences/actions are described in FIG. 24.

At block 2102, process 2100 receives conversation scores and sub-scores. Conversation scores and sub-scores correspond to conversation analysis indicators. In one implementation, process 2100 receives a conversation score and subscores, such as an openness score, an engagement score, an enthusiasm score, a conversation effectiveness score, an ownership score, a goal score, an interruption score, a "time spent listening" score, a conversation quality score, etc. The conversation analysis indicators can be generated as discussed above, such as by sequential machine learning systems 410 and 610 and process 900. In some implementations, multiple instances of a machine learning system are used to each generate different conversation analysis indicators. For example, a first sequential machine learning system can be configured to generate an openness score, and a second sequential machine learning system can be configured to generate a conversation quality score.

At block 2104, process 2100 can access a mentee profile including a progress score. The mentee profile may be accessed based on a user identifier (e.g., username, email address) associated with the conversation. The mentee profile includes a progress score, tracking the progress of the user throughout multiple conversations as defined by the conversation analysis indicators. For example, an engagement score may be tracked across multiple conversations to investigate the user's development of conversation skills in the context of a coaching relationship. This skill development may be quantified as the progress score. The user profile may further include previous conversation scores, subscores, and conversation videos.

At block 2106, process 2100 determines an updated progress score. Process 2100 determines the updated process score by combining the retrieved mentee profile with the received conversation analysis indicators. For example, in response to receiving conversation analysis indicators including a low value of an engagement score, process 2100 may determine that a progress score retrieved from a mentee profile should be slightly decreased. As another example, in response to receiving a very high conversation score, process 2100 may determine that the progress score should be moderately increased. In some implementations, process 2100 further accesses previous conversation scores to determine the updated progress score. For example, in response to a small improvement in a sub-score that has previously remained at low levels, process 2100 may determine an oversized increase in the progress score to reflect the breakthrough. In some implementations, the progress score can be an average (or time-weighted average) of values from a series of conversation analysis indicators.

In some implementations, process 2100 includes identified conversation highlights. For example, process 2100 at block 2108 may determine some segments of the conversation video that reflect significant changes made to the progress score at block 2106. For example, process 2100 may identify a conversation highlight at a point in the conversation where a conversation quality score increased by 20%, and can associate with the highlight point a video segment illustrating the conversation in a time segment before the highlight. As another example, process 2100 may, in response to a decreased openness score, choose video subsegments before the highlight that show interruptions in the conversation between the mentee and coach.

At block 2110, process 2100 can transmit an alert to a computing device associated with the user. For example, may retrieve a text message capable phone number, email, web interface (e.g., writing to a database with a user identifier), address, etc., from the user profile, and further transmit a message including the conversation score and/or the updated progress score. Process 2100 may include transmitting emails, text messages, mobile device push notifications, setting database fields for triggering web notifications, etc. In some implementations, process 2100 accesses a mapping of conversation scores/progress scores to actions/messages. In one example, process 2100 may determine a low engagement score and subsequently transmit an alert including the message "watch previous conversation highlights" and a link to a web application. The web application may be hosted by interface and mapping system 2008, shown in FIG. 20. In another example, process 2100 may determine a high conversation score and transmit an alert including the message "Great conversation today! Your conversation score was 87/100!" These notifications can provide a reference frame, such as "Your progress score was good; in fact, it is in the top quartile of all coaching conversations and is a personal best for you."

Further in response to receiving conversation scores at block 2102, process 2100 can access a coach profile including a performance score at block 2112. In some implementations, process 2100 updates a coach profile (e.g., updating performance score) in parallel to processing a mentee profile, as illustrated in blocks 2104-2110. Process 2100 can access the coach profile based on an identifier included in the conversation score data, such as a coach user identifier or email address. The retrieved coach profile can include a performance score, defining the performance of the coach across conversations with the mentee or with multiple mentees. At block 2114, process 2100 determines an updated performance score based on the coach profile in the received conversation analysis indicators from block 2102. For example, the performance score may be increased based on conversation score data including a high engagement score with the mentee in the conversation. As another example the performance score may be decreased based on conversation analysis indicators including a low conversation quality score. In some implementations, the performance score can be an average (or time-weighted average) of values from a series of conversation analysis indicators.

In some implementations, process 2100 includes identifying training moments at block 2116. Similarly to highlight moments from block 2108, training moments can be determined based on changes in conversation analysis indicators determined for points throughout the conversation. The training moments can be associated with corresponding video segments from the conversation. More specifically, process 2100 can include determining subsegments of a conversation video based on significant (e.g., extreme, changed) conversation analysis indicators determined at various points throughout the conversation. For example, process 2100 may select a video segment just prior to a low openness score. As another example, process 2000 may select a video segment illustrating delayed responses and/or nonspecific responses that occur just prior to a low engagement score.

At block 2118, process 2100 includes transmitting an alert to a computing device associated with the coach. The alert is sent based on a device address retrieved from the coach profile, and may include an email, text message, mobile device push notification, database write, etc. In one example, the alert includes "Great work today—high conversation score." In another example, the alert includes "Please review the training on active listening—recent low conversation scores" and a link to active listening training materials.

Figure 22:
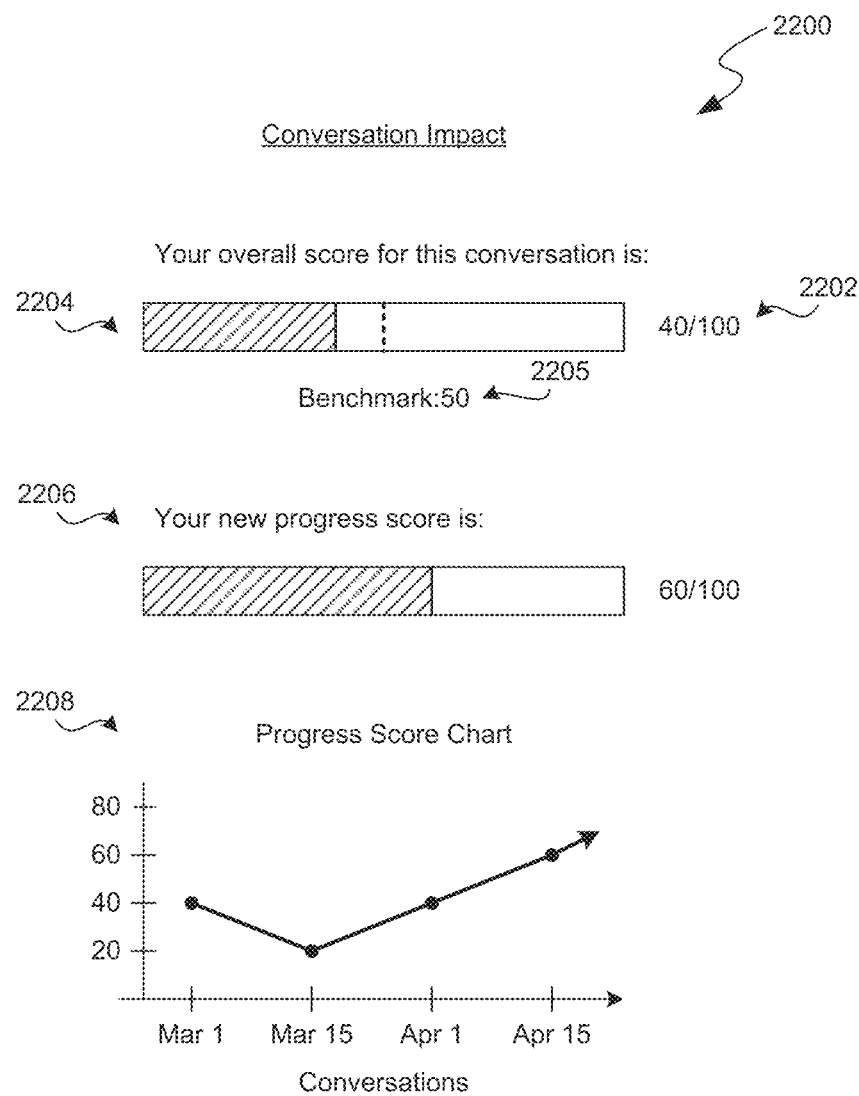
FIG. 22 illustrates an example user interface for visualizing the impact of a conversation.

FIG. 22 illustrates an example user interface for visualizing the impact of a conversation. User interface 2200 facilitates a user evaluating their progress in a coaching relationship, and the impact of a particular (e.g., most recent) conversation. As an example, a user may receive user interface 2200 in an email after a conversation. As another example, a mentee may access user interface 2200 as a webpage from an online dashboard. User interface 2200 includes conversation score 2202 and progress score 2206. Conversation score 2202 quantifies the impact of a particular conversation (e.g., is a projected impact of the conversation on one or both participants), and progress score 2206 tracks a user's overall progress toward a coaching goal.

Conversation score 2202 is an overall rating of a particular conversation. In some implementations, conversation score 2202 is calculated by combining multiple conversation analysis indicators, such as an openness score, an engagement score, and an enthusiasm score. Conversation score 2202 and/or multiple sub-scores are generated by a conversation analysis system, such as the system shown in FIG. 4. More specifically, conversation score 2202 and/or multiple sub-scores (e.g., an engagement score, an ownership score, a goal score, an interruptions score, a "time spent listening" score, an openness score, etc.) are generated by one or more machine learning systems based on identified conversation features (e.g., audio and video from a conversation, facial expressions, voice tone, key phrases, etc.) of the recorded conversation. In various implementations, the user interface 2200 can include indications of such sub-scores. These can be shown as sub-scores for the conversation or as sub-progress scores in each category for the sub-score, generated from combinations of sub-scores in that category from the conversation and previous conversations.

Progress score 2206 can be updated based on conversation score 2202. In other words, progress score 2206 tracks a cumulative result of conversation scores multiple conversations over time. Progress score 2206 can be associated with a user profile, such as a mentee profile, and defines the user's progress across multiple conversations. For example, progress score 2206 can be calculated based on trends in the user's individual conversation scores.

User interface 2200 includes conversation score 2202 and bar chart 2204. Bar chart 2204 further includes benchmark 2205. The visualization of both conversation scores 2202 and benchmark 2205 in bar chart 2204 facilitates a user analyzing their performance in contrast to standard progress.

User interface 2200 includes both conversation score 2202 (for a particular conversation), and progress score 2206 reflecting updates after the conversation. Progress score 2206 may include a benchmark indicator similar to benchmark 2205, providing the user a way to interpret the user's conversation score 2202. For example, the benchmark can indicate the user's last or average conversation score, the average conversation score of other users, a goal conversation score set by the coach or third party, etc. Conversation score 2204 is illustrated as a bar to where the score falls on a range of 0-100. Progress score 2206 in this example is illustrated as a bar to show the progress toward a goal. User interface 2200 may further include progress score chart 2208, illustrating values of the performance score at preset intervals or after each conversation. Progress score chart 2208 facilitates a user analyzing their progress, and the impact of individual conversations on their progress. In some implementations, the user interface can include additional elements such as coach annotations or suggestions, links to training materials that correlate to various scores, etc.

Figure 23:
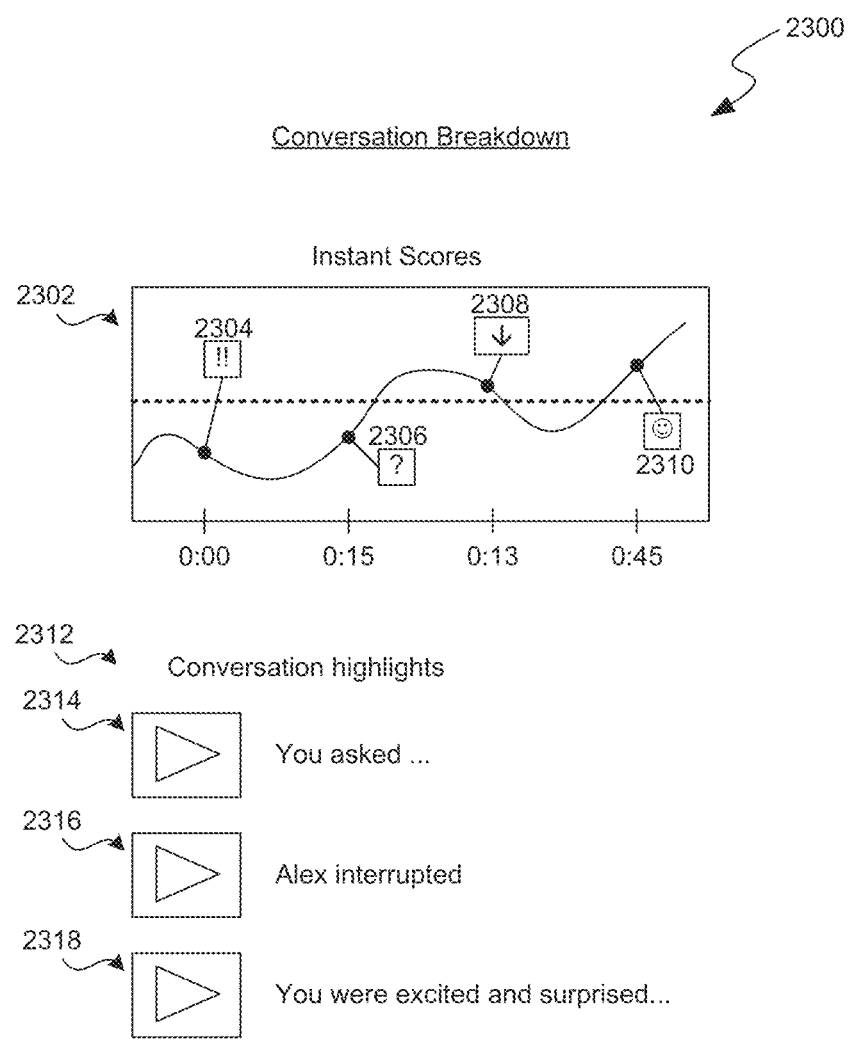
FIG. 23 illustrates an example user interface for visualizing a conversation.

FIG. 23 illustrates an example user interface for visualizing a conversation. More specifically, user interface 2300 facilitates a user analyzing the features of a particular conversation, in a "conversation breakdown" view. For example, a user may receive an email including user interface 2300 after a conversation, may view interface 2300 in a web page implementing user interface 2300, and/or may view interface 2300 in an app. User interface 2300 facilitates a user (e.g., a coach, a mentee) analyzing the particulars of a conversation, such as individual events that impacted the score for the conversation.

In the illustrated embodiment, user interface 2300 includes callouts for identified features in the conversation (e.g., interruptions, questions, facial expressions) that impacted the score for the conversation. User interface 2300 also includes links to review conversation highlights (e.g., video segments) that the conversation analysis system identified as significant. For example, user interface 2300 includes a link to a video segment including one speaker interrupting another, facilitating the user reviewing the conversation to improve their conversation skills.

In the example implementation, user interface 2300 includes instant scores. Instant scores are a dynamic value of the conversation analysis indicators for a particular moment in the conversation. Instant scores facilitate the user reviewing how the conversation analysis indicators changed throughout the conversation. For example, a conversation may have a moderate overall conversation score. However, the instant score may include relative minimums/maximums in response to events in the conversation. Instant scores may also be referred to as instantaneous scores, instantaneous conversation analysis indicators, partial scores, conversation values, and so on.

User interface 2300 includes instant score chart 2302. Instant scores are associated with particular points in a conversation and reflect the status of the conversation at or up until that point. The instant scores react to events in the conversation, while overall conversation analysis indicators consider the conversation as a whole. Score chart 2302 is arranged based on timestamps from the conversation. The instantaneous scores throughout the conversation can be visualized as a continuous curve. In some implementations, score chart 2302 further includes callouts of particular events. For example, callout 2304 includes a bang symbol and indicates an interruption. Callout 2304 associates the interruption with the timestamp and the decrease in the conversation analysis indicator. Callout 2306 includes a question mark symbol, and indicates a question was asked. The timestamp associated with callout 2306 facilitates a user reviewing the question and places the question in the context of increasing the conversation analysis indicator. Callout 2308 includes a down arrow and indicates a negative remark from a speaker in the conversation. Callout 2310 includes a smile icon and indicates a speaker in the conversation smiled (as identified based on their facial expression).

User interface 2300 further includes conversation highlights 2312, which may each be associated with one of the callouts from score chart 2302. Conversation highlight 2314 includes a thumbnail of the video associated with the conversation highlight, and a brief overview of the content. In the example implementation, the overview includes a transcript of the highlighted conversation segment. Conversation highlights 2312 may be presented in chronological order (e.g., in the same order as the callouts in score chart 2302).

Figure 24:
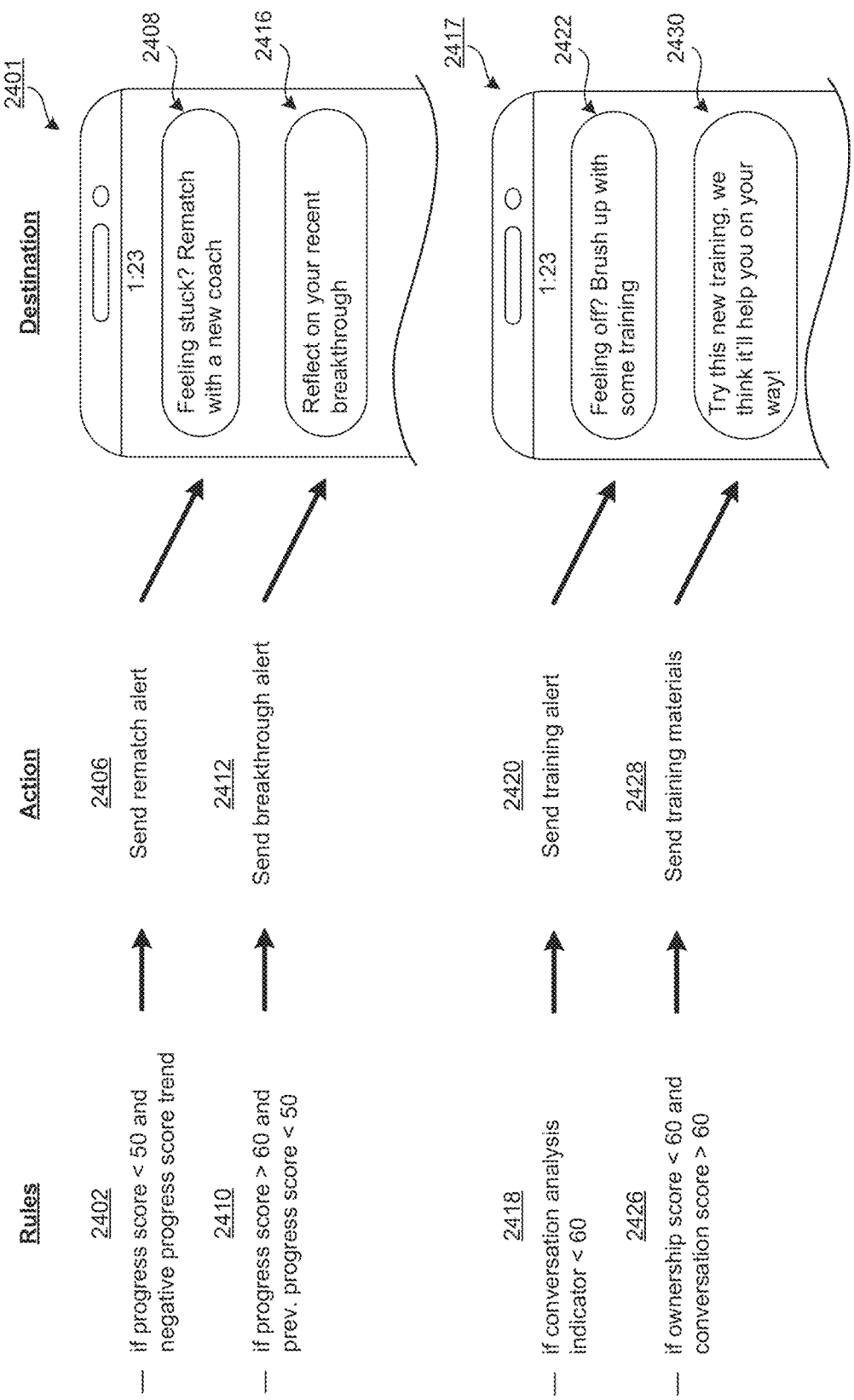
FIG. 24 illustrates mapping types of conversation analysis indicators to inferences and actions.

FIG. 24 illustrates mapping types of conversation analysis indicators (e.g., conversation and progress scores, engagement scores, ownership scores, goal scores, interruptions scores, "time spent listening" scores, etc.) to inferences and actions. In the illustrated implementation, rules are applied to conversation analysis indicators to determine actions (e.g., notifications, triggering new coaching pairing, suggesting training materials, selecting coaching techniques, etc.). Notifications may include text messages, mobile device push notifications, emails, etc.

Rule 2402 corresponds to action 2406. Rule 2402 includes the statement "if progress_score<50 [less than fifty] and negative progress_score trend" and is configured to be evaluated against progress scores and/or user profiles. Action 2406 includes sending a rematch alert to mobile device 2401 (e.g., a mobile device associated with a user/mentee), the alert may include a deeplink (e.g., URL with additional parameters) configured to launch a web browser or client application on the mobile device and navigate to a rematch webpage. Rematch action 2406 enables a user to select a new coach. Alert 2408 is illustrated as a notification on an end user's device and may be actionable. For example, a user may click or tap on the notification to launch the associated URL or mobile application.

Rule 2410 defines that action 2412 is executed if "progress_score>60 and previous progress_score<50." Action 2414 includes sending a breakthrough alert, illustrating the recent change in progress scores. Alert 2416 includes a message and a link to view the conversation summary (e.g., user interface 2300 from FIG. 23).

Rule 2418 defines that action 2420 is executed if "conversation_analysis_indicator<60." Action 2420 includes sending a training alert to coach mobile device 2417. Alert 2422 includes a training message and a link (e.g., URL, mobile application link, website link) to applicable training.

Rule 2426 defines that action 2428 is executed if "ownership_score<60 and conversation_score>60." Action 2428 includes sending a link to training materials that people with similar scores found helpful. Alert 2430 includes a message and a link to access the selected training material.

Figure 25:
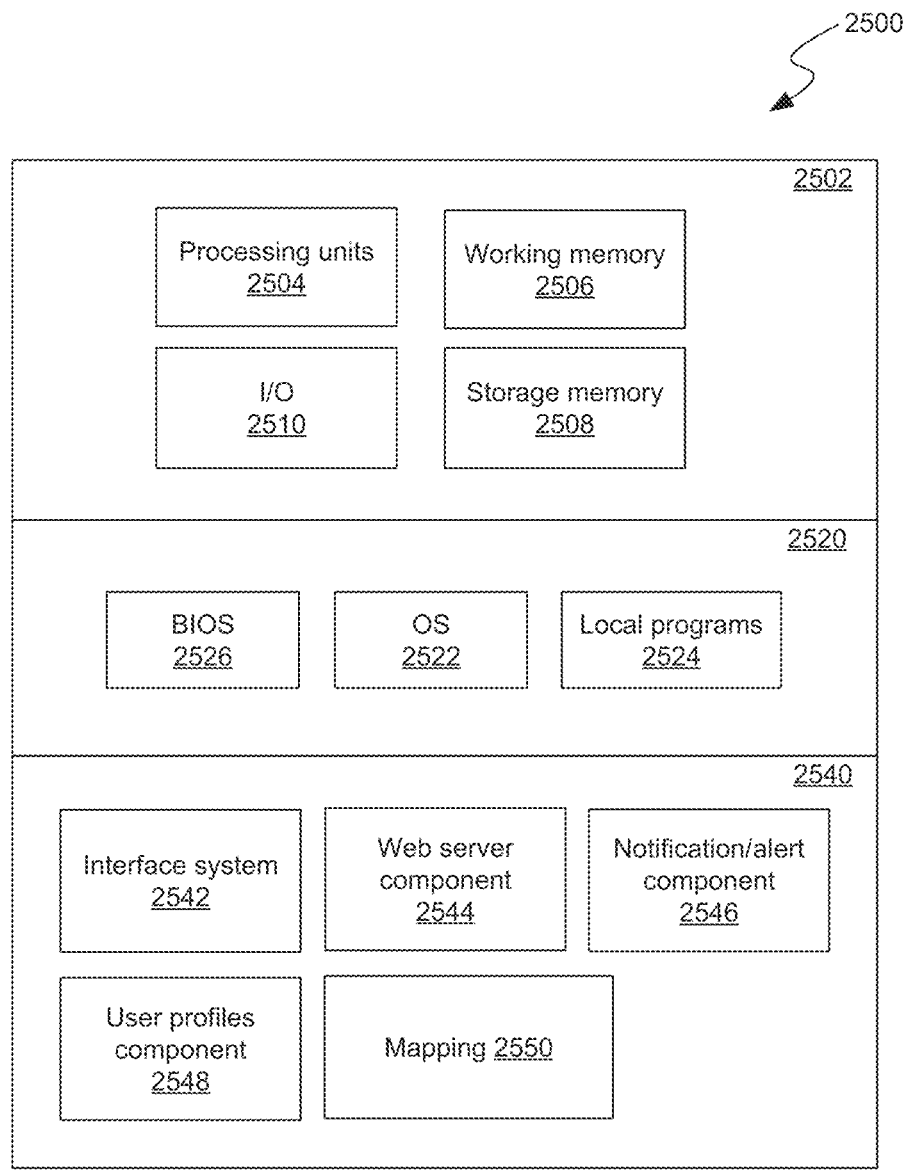
FIG. 25 is a block diagram illustrating components which, in some implementations, can be used in a system employing the disclosed technology.

FIG. 25 is a block diagram illustrating components 2500 which, in some implementations, can be used in a system employing the disclosed technology. The components 2500 include hardware 2502, general software 2520, and specialized components 2540. As discussed above, a system implementing the disclosed technology can use various hardware including processing units 2504 (e.g., CPUs, GPUs, APUs, etc.), working memory 2506, storage memory 2508 (local storage or as an interface to remote storage, such as storage 215 or 225), and input and output devices 2510. In various implementations, storage memory 2508 can be one or more of: local devices, interfaces to remote storage devices, or combinations thereof. For example, storage memory 2508 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 2500 can be implemented in a client computing device, such as client computing devices 205 or on a server computing device, such as server computing device 210 or 220.

General software 2520 can include various applications including an operating system 2522, local programs 224, and a basic input output system (BIOS) 2526. Specialized components 2540 can be subcomponents of a general software application 2520, such as local programs 224. Specialized components 2540 can include web server component 2544, notification/alert component 2546, user profiles component 2548, mapping 2550, and components which can be used for providing user interfaces, transferring data, and controlling the specialized components, such as interface system 2542. In some implementations, components 2500 can be in a computing system that is distributed across multiple computing devices or can be an interface to a server-based application executing one or more of specialized components 2540.

In one implementation, web server component 2544 receives requests from user devices over the internet and transmits HTML webpages in response. The webpages can implement user interfaces, such as those shown in FIGS. 22 and 23. For example, web server component 2544 may generate webpages for visualizing a user's progress across multiple conversations or analyzing the impact of a particular conversation. The webpages may include rich content (e.g., charts, graphs, videos, images) as shown in, for example, conversation highlights 2312 in FIG. 23, and progress score chart 2208 in FIG. 22. In other implementations, web server component 2544 generates emails including HTML. For example, user interface 2300 (shown in FIG. 23) may be transmitted in an email, or as a webpage. In some implementations, the email includes dynamic content, such as Active Mobile Pages (AMP) content.

User profiles component 2548 stores user profiles. User profiles component 2548 is configured to determine a user profile associated with conversation videos and/or conversation score data. For example, user profiles component may store conversation score data in a user profile based on a user identifier in the score data. Thus, user profile component 2548 facilitates a user reviewing their progress over time, including multiple conversation videos and instances of score data. In some implementations, user profiles component 2548 maintains separate databases for different types of users, such as coaches, mentees, and annotators. For example, user profiles component 2548 may store a relation between coaches and mentees. In some implementations, user profiles component 2548 stores authentication and user identifier data. For example, user profiles component 2548 may store and/or validate addresses and identifiers associated with users, such as email addresses, phone numbers, device identifiers, and so on.

Alert component 2546 is configured to transmit alerts/notifications based on addresses/identifiers included in user profiles. Alert component 2546 is configured to transmit emails, text messages, mobile device push notifications, and so on. In some implementations, alert component 2546 stores a phone number associated with a user (e.g., coach, mentee) and transmits text messages including conversation scores. In other implementations, alert component 2546 stores a device identifier, and transmits alerts using a push notification service. In yet other implementations, alert component 2546 stores multiple addresses associated with a user (e.g., email address, phone number, device identifier), and automatically selects the appropriate alert channel. For example, alert component 2546 may send an alert of a changed progress score via text message, and a link to review conversation highlights via email. As another example, alert component 2546 may determine a user is only setup for emails and only send alerts via email.

Mapping 2550 is configured to apply a mapping to conversation analysis indicators to determine corresponding actions or inferences. In one implementation, mapping 2550 can include rules or conditions that can be applied against various conversation analysis indicators. The rules can be mapped to actions to take and/or inferences that can be included in user interfaces, e.g., to fill in a template. For example, a score for a certain conversation quality analysis indicator being below a threshold can be mapped to an inference that the coach and mentee matchup is poor, which can be indicated by filling in a coaching match template sent in a notification to an administrator of the system.

Figure 26:
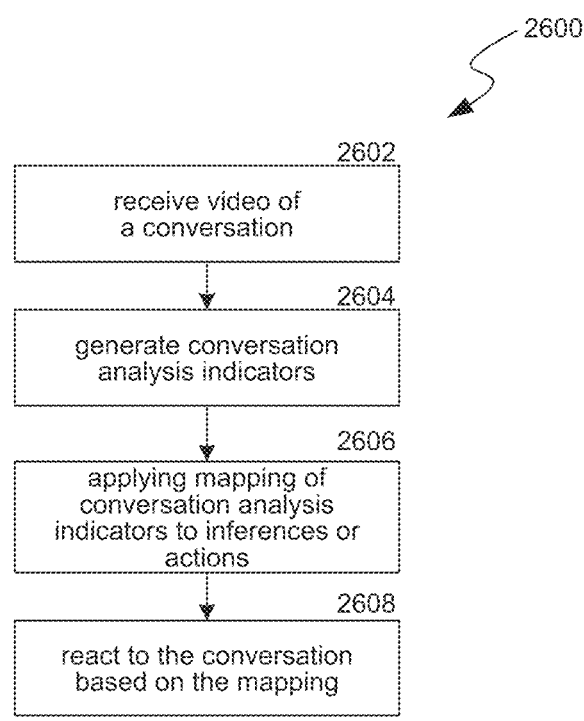
FIG. 26 illustrates process for mapping conversation scores to inferences or actions.

FIG. 26 illustrates process 2600 for mapping conversation scores to inferences and/or actions. At block 2602, process 2600 receives video of a conversation. In the example implementation, the conversation includes a coach and a mentee. The conversation may include any combination of speakers, such as coaches, mentees, annotators, and so on. The conversation video may be recorded from a single location. Alternatively, the conversation video may be recorded from a videoconference. In some implementations, process 2600 receives the video after it was recorded. In other implementations, process 2600 accesses the conversation video as it is recorded, e.g., from the videoconference system or service.

At block 2604, process 2600 generates conversation analysis indicators. Conversation analysis indicators may include conversation scores, conversation sub-scores, instant score data, etc. In the example implementation, process 2600 coordinates with a machine learning conversation analysis system (e.g., sequential machine learning system 410 or 610). In some implementations, process 2600 may execute multiple instances of a sequential machine learning system for conversation analysis, each instance configured to generate a particular conversation analysis indicator (e.g., emotional score, emotional labels, ownership score, etc.).

At block 2606, process 2600 accesses a mapping of conversation analysis indicator values to inferences and/or actions. Mapping of scores to inferences and/or actions is illustrated, e.g., in FIG. 24. In one implementation, process 2600 evaluates stored rules to determine actions. For example, a progress score of 65 may match with a rule of "progress_score>50", and thus trigger an associated action. In some implementations, actions include transmitting a notification or alert. For example, process 2600 may transmit an email in response to a high conversation score. As another example, process 2600 may, in response to a low conversation score, write to a database which will provide results in a web interface for a user based on a template. Examples of such rules, notifications and user interfaces are illustrated in FIGS. 22-24. In some implementations, results from applying the mapping that produce an inference can be further mapped to other inferences or actions. For example, an ownership score of 15/100 with an engagement score of 86/100 can be mapped to an inference that the user is likely suffering from imposter syndrome. This inference can be stored in association with the user and/or surfaced to the user's coach. In addition, this inference can be further mapped, e.g., a mapping entry can specify that users with a progress score over 40/100 and that are likely suffering from imposter syndrome would benefit from a confidence boosting training module, and can be mapped to an action to send that training module to the user.

At block 2608, process 2608 reacts to the conversation based on the mapping 2608. For example, process 2608 may execute an action associated with a triggered rule, such as sending a text message, push notification, or email. In another example, process 2608 may initiate a coach rematch process. More specifically, process 2608 may retrieve available coaches and generate an email including suggested replacement coaches. As another example, process 2608 may transmit a text message including a link to a webpage implementing the user interface shown in FIG. 22, the text message may include a message inviting a user to review their progress. As yet another example, process 2608 may generate an email implementing the user interface shown in FIG. 22. In other words, process 2608 may transmit an email including a conversation score chart, and links to view conversation highlights.

As used above, multiparty conversations, conversation features, conversation analysis indicators, and inferences and actions are described in terms of a coach and/or mentee. However, the systems and methods described herein can equally be used for with other multiparty conversations such as team members, teachers and students, managers and employees, or any other set of multiple people.

Those skilled in the art will appreciate that the components illustrated in FIGS. 1-14 described above, and in each of the flow diagrams discussed above, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific implementations have been described herein for purposes of illustration, but various modifications can be made without deviating from the scope of the implementations. The specific features and acts described above are disclosed as example forms of implementing the claims that follow. Accordingly, the implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method to identify synthesized conversation features for recorded conversations, the method comprising:
   receiving one or more videos;
   segmenting the one or more videos into multiple utterances made during a conversation between multiple users, wherein each utterance in the multiple utterances represents a particular verbalized statement from a user in the conversation;
   identifying, for each of the one or more utterances, data modalities including at least acoustic data and video data;
   obtaining text data for each of the one or more utterances, wherein the text data is based on a transcription of the corresponding acoustic data;
   extracting features, for each particular utterance of the one or more utterances, from each of the acoustic data, the video data, and the text data associated with that particular utterance; and
   applying a machine learning model that receives the extracted features and produces the synthesized conversation features, wherein the synthesized conversation features include an emotion indicator, an active listening feature, a speaker characteristics feature, and an enthusiasm feature.

2. The method of claim 1,
wherein the machine learning model that generates the emotion indicator receives at least a gaze direction feature extracted from the video data, a facial expression feature extracted from the video data, a voice tone feature extracted from the acoustic data, and a phrase feature extracted from the text data.

3. The method of claim 1,
wherein the machine learning model that generates the active listening feature receives at least a gaze direction feature extracted from the video data, a head activity feature extracted from the video data, and a responsiveness feature extracted from the acoustic data.

4. The method of claim 1,
wherein the machine learning model that generates the speaker characteristics feature receives at least a speaker tone feature extracted from the acoustic data, a pitch feature extracted from the acoustic data, and a timing feature extracted from the acoustic data.

5. The method of claim 1,
wherein the machine learning model that generates the enthusiasm feature receives at least a speaker tone feature extracted from the acoustic data, a speaker volume feature extracted from the acoustic data, and a facial expression feature extracted from the video data.

6. The method of claim 1, wherein applying the machine learning model further comprises retrieving previously generated synthesized conversation features and producing the one or more synthesized conversation features based on the previously generated synthesized conversation features.

7. The method of claim 1, wherein the data modalities further include a biometric data modality.

8. A computing system for identifying synthesized conversation features in recorded conversations, the computing system comprising:
one or more processors; and
one or more memories storing computer-executable instructions that, when executed by the one or more processors, cause the computing system to perform operations comprising:
receiving one or more videos;
segmenting the one or more videos into multiple utterances made during a conversation between multiple users, wherein each utterance in the multiple utterances represents a particular verbalized statement from a user in the conversation;
identifying, for each of the one or more utterances, data for multiple modalities;
extracting features, for each particular utterance of the one or more utterances, from each of the data for the multiple modalities associated with that particular utterance; and
applying a machine learning model that receives the extracted features and produces the synthesized conversation features, wherein the synthesized conversation features include an emotion indicator, an active listening feature, a speaker characteristics feature, and an enthusiasm feature.

9. The computing system of claim 8,
wherein the machine learning model that generates the emotion indicator receives at least a gaze direction feature extracted from video data from the data for the multiple modalities, a facial expression feature extracted from video data from the data for the multiple modalities, a voice tone feature extracted from the acoustic data, and a phrase feature extracted from text data from the data for the multiple modalities.

10. The computing system of claim 8,
wherein the machine learning model that generates the active listening feature receives at least a gaze direction feature extracted from video data from the data for the multiple modalities, a head activity feature extracted from the video data, and a responsiveness feature extracted from acoustic data from the data for the multiple modalities.

11. The computing system of claim 8,
wherein the machine learning model that generates the speaker characteristics feature receives at least a speaker tone feature extracted from acoustic data from the data for the multiple modalities, a pitch feature extracted from the acoustic data, and a timing feature extracted from the acoustic data.

12. The computing system of claim 8,
wherein the machine learning model that generates the enthusiasm feature receives at least a speaker tone feature extracted from acoustic data from the data for the multiple modalities, a speaker volume feature extracted from the acoustic data, and a facial expression feature extracted from video data from the data for the multiple modalities.

13. The computing system of claim 8, wherein the operations further comprise obtaining text data for each of the one or more utterances, and the text data is based on a transcription of acoustic data from the data for the multiple modalities.

14. The computing system of claim 8, wherein the multiple modalities further includes a biometric data modality.

15. A computer-readable storage medium storing instructions that, when executed by a computing system, cause the computing system to perform actions comprising:
receiving one or more videos;
segmenting the one or more videos into multiple utterances made during a conversation between multiple users, wherein each utterance in the multiple utterances represents a particular verbalized statement from a user in the conversation;
identifying, for each of the one or more utterances, data for multiple modalities;
extracting features, for each particular utterance of the one or more utterances, from each of the data for the multiple modalities associated with that particular utterance; and
applying a machine learning model that receives the extracted features and produces the synthesized conversation features, wherein the synthesized conversation features include an emotion indicator, an active listening feature, a speaker characteristics feature, and an enthusiasm feature.

16. The computer-readable storage medium of claim 15,
wherein the machine learning model that generates the emotion indicator receives at least a gaze direction feature extracted from video data from the data for the multiple modalities, a facial expression feature extracted from the video data, a voice tone feature extracted from acoustic data from the data for the multiple modalities, and a phrase feature extracted from text data from the data for the multiple modalities.

17. The computer-readable storage medium of claim 15,
wherein the machine learning model that generates the active listening feature receives at least a gaze direction feature extracted from video data from the data for the multiple modalities, a head activity feature extracted from the video data, and a responsiveness feature extracted from acoustic data from the data for the multiple modalities.

18. The computer-readable storage medium of claim 15, wherein the machine learning model that generates the speaker characteristics feature receives at least a speaker tone feature extracted from acoustic data from the data for the multiple modalities, a pitch feature extracted from the acoustic data, and a timing feature extracted from the acoustic data.

19. The computer-readable storage medium of claim 15, wherein the machine learning model that generates the enthusiasm feature receives at least a speaker tone feature extracted from acoustic data from the data for the multiple modalities, a speaker volume feature extracted from the acoustic data, and a facial expression feature extracted from video data from the data for the multiple modalities.

20. The computer-readable storage medium of claim 15, wherein applying a machine learning model further comprises retrieving previously generated synthesized conversation features and producing the one or more synthesized conversation features based on the previously generated synthesized conversation features.

21. The computer-readable storage medium of claim 15, wherein the actions further comprise obtaining text data for each of the one or more utterances, and the text data is based on a transcription of acoustic data from the data for the multiple modalities.

* * * * *